US008089025B2

(12) United States Patent
Sanders

(10) Patent No.: US 8,089,025 B2
(45) Date of Patent: Jan. 3, 2012

(54) GAS-COOLED PLASMA ARC CUTTING TORCH

(75) Inventor: Nicholas A. Sanders, Norwich, VT (US)

(73) Assignee: Hypertherm, Inc., Hanover, NH (US)

( * ) Notice: Subject to any disclaimer, the term of this patent is extended or adjusted under 35 U.S.C. 154(b) by 161 days.

(21) Appl. No.: 12/032,630

(22) Filed: Feb. 15, 2008

(65) Prior Publication Data

US 2008/0217305 A1 Sep. 11, 2008

Related U.S. Application Data

(60) Provisional application No. 60/904,804, filed on Feb. 16, 2007.

(51) Int. Cl.
*B23K 10/00* (2006.01)

(52) U.S. Cl. ........... 219/121.49; 219/121.5; 219/121.51; 219/121.52; 219/75

(58) Field of Classification Search ............. 219/121.36, 219/121.39, 121.45, 121.5, 121.52, 121.59, 219/74, 75, 137.62, 76.11; 313/231.31, 231.41; 315/111.21
See application file for complete search history.

(56) References Cited

U.S. PATENT DOCUMENTS

| | | | | | |
|---|---|---|---|---|---|
| 3,858,072 | A | * | 12/1974 | Dembovsky | 313/32 |
| 4,405,853 | A | * | 9/1983 | Klein | 219/121.5 |
| 4,659,899 | A | * | 4/1987 | Welkie et al. | 219/121.49 |
| 4,782,210 | A | * | 11/1988 | Nelson et al. | 219/121.52 |
| 4,791,268 | A | | 12/1988 | Sanders et al. | 219/121.57 |
| 4,902,871 | A | | 2/1990 | Sanders et al. | 219/121.49 |
| 5,132,512 | A | | 7/1992 | Sanders et al. | 219/121.5 |
| 5,308,949 | A | | 5/1994 | Reed, Jr. et al. | 219/121.5 |
| 5,317,126 | A | | 5/1994 | Couch, Jr. et al. | 219/121.51 |
| 5,393,952 | A | | 2/1995 | Yamaguchi et al. | 219/121.5 |
| 5,451,739 | A | | 9/1995 | Nemchinsky et al. | 219/121.51 |
| 5,965,040 | A | * | 10/1999 | Luo et al. | 219/121.5 |

(Continued)

FOREIGN PATENT DOCUMENTS

WO WO 01/76328 10/2001

(Continued)

OTHER PUBLICATIONS

International Search Report and Written Opinion for International Application No. PCT/US2008/054182 dated Jun. 20, 2008.

*Primary Examiner* — Mark Paschall
(74) *Attorney, Agent, or Firm* — Proskauer Rose LLP

(57) ABSTRACT

A method and apparatus for a gas-cooled plasma arc torch. Components of the torch can include an electrode, nozzle and a shield, each of which can be gas-cooled. The nozzle can be disposed relative to the electrode and can include a generally hollow conductive body and a cooling gas flow channel defined by at least one fin disposed about an exterior surface of the body, the body providing a thermal conductive path that transfers heat between the nozzle to the cooling gas flow channel during operation of the torch. The shield can be disposed relative to the nozzle and can include a generally hollow conductive body and a cooling gas flow channel defined by at least one fin disposed about an exterior surface of the body, the body providing a thermal conductive path that transfers heat between the shield to the cooling gas flow channel during operation of the torch.

36 Claims, 30 Drawing Sheets

U.S. PATENT DOCUMENTS 6,084,199 A 7/2000 Lindsay et al. .......... 219/121.52
6,385,977 B1 * 5/2002 Johnson ............................ 62/64
6,403,915 B1 6/2002 Cook et al. ............... 219/121.52
6,987,238 B2 1/2006 Horner-Richardson et al. ........................ 219/121.51
7,071,443 B2 7/2006 Conway et al. .......... 219/121.48
7,126,080 B1 10/2006 Renault et al. ........... 219/121.48
2005/0109738 A1 5/2005 Hewett et al. ............ 219/121.48
2006/0237399 A1 * 10/2006 Horner-Richardson et al. ........................ 219/121.51
2006/0289398 A1 12/2006 Cook et al. ................. 219/121.5
2007/0210034 A1 9/2007 Mather et al. .............. 219/121.5
2007/0262060 A1 11/2007 Roberts et al. ............. 219/121.5

FOREIGN PATENT DOCUMENTS

WO 2007/133904 11/2007

* cited by examiner

GAS-COOLED PLASMA ARC CUTTING TORCH

CROSS-REFERENCE TO RELATED APPLICATION

This application claims the benefit of and priority to U.S. provisional patent application Ser. No. 60/901,804 filed on Feb. 16, 2007, the disclosure of which is incorporated herein by reference in its entirety.

FIELD OF THE INVENTION

The invention relates generally to the cutting of materials and plasma arc torches. More specifically, the invention relates to design and cooling techniques to enhance the performance and life expectancy of plasma arc torches and torch consumables.

BACKGROUND OF THE INVENTION

Contact start plasma arc torches generally do not require the torch to contact the metal workpiece being cut or welded by the torch at the time the plasma arc is initiated. Contact start plasma torches can include "blow back" cutting torch technologies, which are described in U.S. Pat. No. 4,791,268 and U.S. Pat. No. 4,902,871, the contents of which are incorporated herein by reference in their entirety. The contact start plasma torch can include an electrode (e.g., cathode) that can move axially within the torch body under the influence of a spring, and gas forces that oppose the spring. The gas forces can act on lower surfaces of the electrode adjacent the anode, such as the torch nozzle. During torch start up, a gas pressure in the region between the electrode and the anode can build to a sufficient level to lift the electrode against the spring, this separation igniting the plasma arc. When cutting is stopped and the gas flow is terminated, the spring biases the electrode to a position in which it contacts the nozzle and seals off the plasma exit port in the nozzle.

Plasma arc torches using "blow forward" technologies are also described in U.S. Pat. Nos. 5,994,663, 5,897,795, and 5,841,095, the contents of which are also incorporated herein by reference in their entirety. All of these patents are assigned to Hypertherm, Inc. of Hanover, N.H., the owner of the present invention.

During torch operation, torch consumables (e.g., the electrode, nozzle, and shield) are exposed to high temperatures. The torch consumables can be cooled utilizing various techniques, such as utilizing water injection cooling to cool the nozzle and/or shield, utilizing liquid cooling in the electrode and/or about nozzle, or utilizing vent holes to cool the shield which is described in U.S. Pat. No. 5,132,512, the contents of which are also incorporated herein by reference in their entirety and which is assigned to Hypertherm, Inc. of Hanover, N.H., the owner of the present invention.

One area for improvement to the plasma arc torches relates to cooling consumables for the plasma arc torch (e.g., electrode, nozzle, and shield). Cooling capacity has been a limitation of previous designs relating to plasma arc torches. For example, previous designs have required the use of cooling mediums other than or in addition to a gas (e.g., cooling water or liquid) for torches that operate at high (e.g., 100 or 200 Amps, or more) current levels.

Unfortunately, most of these cooling methods can require cooling systems external to the torch (e.g., which can include water supplies, reservoirs, heat exchange equipment, supply pumps, etc.). External cooling systems can increase the associated equipment expense, can require more maintenance, be vulnerable to spills, and in some cases, can require disposal of the cooling medium. The issue of cooling the plasma arc torch is more acute for higher current systems, as higher current systems can generate more heat and have larger cooling demands. Indeed, commercially available plasma arc torch cutting systems operating at more than about 100 amperes utilize cooling systems using a liquid coolant (e.g., water or glycol). However, as explained above, these systems all suffer from the cost and maintenance issues associated with such systems.

It is therefore an object of this invention to provide a cooling system, process, and related components for a plasma arc torch that avoids these drawbacks.

SUMMARY OF THE INVENTION

The present invention overcomes these issues from previous designs using new gas-cooled torch consumables in a plasma arc torch that operate effectively without the requirement of liquid cooling. In some embodiments, the gas-cooled plasma arc torch is a high current plasma arc torch. In one aspect, the invention features a nozzle for a plasma arc cutting torch having a substantially hollow body capable of receiving an electrode. The nozzle includes a body and an orifice disposed at an end of the body. The nozzle also can include a cooling gas flow channel defined by at least one fin disposed about an exterior surface of the body, the body providing a thermal conductive path that transfers heat between the body and the cooling gas flow channel during operation of the torch.

In another aspect, the invention features a shield for a plasma arc cutting torch capable of protecting a nozzle. The shield includes a body and an orifice disposed at an end of the body. The shield also can include a cooling gas flow channel defined by at least one fin disposed about an exterior surface of the body, the body providing a thermal conductive path that transfers heat between the body and the cooling gas flow channel during operation of the torch.

In yet another aspect, the invention features an electrode for a plasma arc cutting torch. The electrode includes an elongate electrode body and a high thermionic emissivity material disposed at a distal end of the electrode body. The electrode also includes an internal electrical contact surface at a proximal end of the electrode body, the internal electrical contact surface sized to receive a circumscribing radial spring element. The electrode can include an external gas cooled surface including a cooling gas flow channel defined by a fin, the external gas cooled surface disposed opposite the internal electrical contact surface. The electrode can include a wall thickness between the internal electrical contact surface and the gas cooled surface sized to transfer sufficient heat to the cooling gas flow channel during operation of the torch.

In another aspect, the invention features a plasma arc torch including a torch body including a plasma gas flow path for directing a plasma gas to a plasma chamber in which a plasma arc is formed. The plasma arc torch can also include an electrode disposed relative to a first end of the torch body, the electrode including an electric contact means and cooling means to transfer heat from the electrode during operation of the torch.

In yet another aspect, the invention features a plasma arc torch system that includes a torch body including a plasma gas flow path for directing a plasma gas to a plasma chamber in which a plasma arc is formed and an electrode disposed relative to a proximal end of the torch body. The plasma arc torch system can also include a nozzle disposed relative to the electrode at a distal end of the torch body to define the plasma chamber. The nozzle can include a generally hollow conductive body and a cooling gas flow channel defined by at least one fin disposed about an exterior surface of the body, the body providing a thermal conductive path that transfers heat between the nozzle to the cooling gas flow channel during operation of the torch. The plasma arc torch system can also include a shield disposed relative to the nozzle at the distal end of the torch body. The shield can include a generally hollow conductive body and a cooling gas flow channel defined by at least one fin disposed about an exterior surface of the body, the body providing a thermal conductive path that transfers heat between the shield to the cooling gas flow channel during operation of the torch.

In another aspect, the invention features a method for extending the life of a plasma arc cutting torch. The method can include providing a torch body which includes a plasma gas flow path for directing a plasma gas through a swirl ring to a plasma chamber in which a plasma arc is formed. The method can include providing a nozzle, as described above, mounted relative to an electrode at a distal end of the torch body to define the plasma chamber. The method also can include operating the plasma arc cutting torch at an amperage level of at least about 100 Amps.

In yet another aspect, the invention features a method for extending the life of a plasma arc cutting torch. The method can include providing a torch body which includes a plasma gas flow path for directing a plasma gas to a plasma chamber in which a plasma arc is formed. The method can include providing a nozzle mounted relative to an electrode at a distal end of the torch body to define the plasma chamber and providing a shield, as described above, in a spaced relationship to a nozzle at a distal end of the torch body. The method can also include operating the plasma arc cutting torch at an amperage level of at least about 100 Amps.

In other examples, any of the aspects above, or any apparatus or method described herein, can include one or more of the following features described in the embodiments below.

In some embodiments, a body of a nozzle comprises a flange that includes at least one port. The port can be configured to pass at least a portion of a cooling gas flow between the flange and the cooling gas flow channel during operation of the torch. In some embodiments, the cooling gas flow channel can include a spiral groove disposed on an external surface of the body of the nozzle. In some embodiments, the cooling gas flow channel can be supplied by more than one gas source. The cooling gas flow channel can include a width, a height and a length dimensioned to establish sufficient heat transfer from the nozzle to a cooling gas flow channel during operation of the torch. In some embodiments, the body of the nozzle can be substantially cylindrical.

In some embodiments, a height of the shield is at least half of the diameter of the body. In some embodiments, the cooling gas flow channel includes a spiral groove disposed on an external surface of the body of the shield. In some embodiments, the shield also includes a flange that includes at least one port, the port configured to pass at least a portion of a cooling gas flow passing between the flange and the cooling gas flow channel during operation of the torch. In some embodiments, the cooling gas flow channel can be supplied by more than one gas source. In some embodiments, the cooling gas flow channel includes a width, a height, and a length dimensioned to establish sufficient heat transfer from the shield to a cooling gas flow channel during operation of the torch.

In some embodiments, the shield also includes a central longitudinal axis. An interior surface of the shield can define in part a shield gas flow passage. In some embodiments, the shield includes a bleed port off-set from a central longitudinal axis of the shield that creates an exit flow counter to a swirling motion of the shield gas flow, thereby dampening the swirling motion of the shield gas flow exiting the exit orifice of the shield.

The internal electrical contact surface can include a feature to retain the circumscribing radial spring element within a bore that is at least partially defined by the internal electrical contact surface. In some embodiments, the electrode includes an internal electrical contact surface sized to center the circumscribing radial spring element. A ratio of a diameter of the internal electrical contact surface to a length of the internal electrical contact surface can be less than about ⅔. In some embodiments, the internal electrical contact surface has a length that is not more than about three times the diameter of the internal contact surface. In one embodiment, the length is approximately 0.6 to 0.8 inches and the diameter is approximately 0.3 inches.

In some embodiments, the cooling gas flow channel includes a spiral groove disposed on an external surface of the electrode. In some embodiments, the cooling gas flow channel can be supplied by more than one gas source. In some embodiments, the cooling gas flow channel includes a width, a height and a length dimensioned to establish a pressure drop that results in sufficient heat transfer from the electrode to a cooling gas flow channel during operation of the torch.

In some embodiments, the electrode includes an internal electrical contact surface is conductively cooled by a cooling gas flow. The internal electrical contact surface of the electrode can react against a circumscribing radial spring element when installed in the torch. In some embodiments, a circumscribing radial spring element is attached to the torch by a diametric interference fit. In some embodiments, the cooling gas flow channel is dimensioned to provide an amount of pressure drop sufficient to overcome a longitudinal frictional resistance between the internal electrical contact surface and the circumscribing radial spring element.

In some embodiments, the internal electrical contact surface includes the circumscribing radial spring element that, when installed in the torch, reacts against an electrical contact surface of the torch. In some embodiments, the cooling gas flow channel is dimensioned to provide an amount of pressure drop sufficient to overcome a longitudinal frictional resistance between the electrical contact surface of the torch and the circumscribing radial spring element. The circumscribing radial spring element can be attached to the internal electrical contact surface by a diametric interference fit.

In some embodiments a method for extending the life of a plasma arc cutting torch includes providing a torch body which includes a plasma gas flow path for directing a plasma gas through a swirl ring to a plasma chamber in which a plasma arc is formed. The method can include providing a nozzle, which can include any of the aspects and/or embodiments as described above, mounted relative to an electrode at a distal end of the torch body to define the plasma chamber. The method also can include operating the plasma arc cutting torch at an amperage level of at least about 100 Amps.

In some embodiments, a method for extending the life of a plasma arc cutting torch includes providing a torch body which includes a plasma gas flow path for directing a plasma gas to a plasma chamber in which a plasma arc is formed. The method can include providing a nozzle mounted relative to an electrode at a distal end of the torch body to define the plasma chamber and providing a shield, which can include any of the aspects and/or embodiments as described above, in a spaced relationship to a nozzle at a distal end of the torch body. The method can also include operating the plasma arc cutting torch at an amperage level of at least about 100 Amps.

In some embodiments, a plasma arc torch includes a nozzle disposed relative to an electrode at a second end of the torch body to define the plasma chamber, the nozzle including cooling means to transfer heat from the nozzle during operation of the torch. In some embodiments, the plasma arc torch includes a shield disposed relative to the nozzle at the second end of the torch body, the shield including cooling means to transfer heat from the nozzle during operation of the torch.

Other aspects and advantages of the invention will become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

The drawings below show different components of different embodiments of a gas-cooled plasma arc torch. Different components of the plasma arc torch (e.g., electrode, nozzle, shield, torch body, swirl ring, etc.) can be designed based on the gases flowing (e.g., cooling gas flow, plasma gas flow) in the torch. For example, the nozzle, shield, electrode, torch body, or any combination thereof can be cooled by a cooling gas flow. The swirl ring of the plasma arc torch can be designed to produce a swirling plasma gas flow to aid in stabilizing the plasma arc or to generate an optimal plasma gas pressure in the plasma chamber or the cooling gas flow channels. The drawings below also show a cooling gas, actuation gas and/or plasma gas flow in different embodiments of a plasma arc torch. The drawings also depict different sealing assemblies that can be used in a gas-cooled torch.

DETAILED DESCRIPTION OF THE INVENTION

Figure 1:
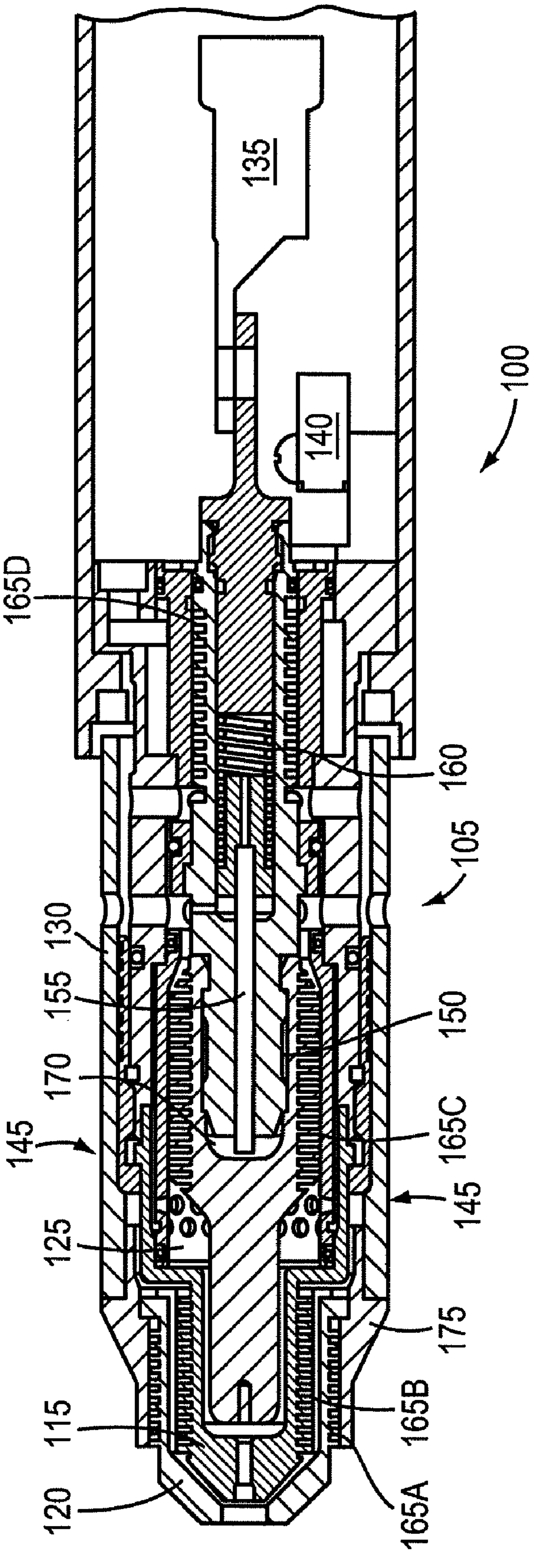
FIG. 1 is a cut-away view of a plasma arc torch, according to an illustrative embodiment.

FIG. 1 is a cut-away view of a plasma arc torch. The plasma arc torch 100 can include components such as a torch body 105, electrode 110, nozzle 115, shield 120, swirl ring 125 and a retainer cap 130. The torch body 105 can include a plasma gas flow path for directing a plasma gas to a plasma chamber in which a plasma arc is formed. The electrode 110 can be disposed relative to a proximal end of the torch body 105. The nozzle 115 can be disposed relative to the electrode 110 at a distal end of the torch body 105, defining the plasma chamber. The shield 120 can be disposed relative to the nozzle 115 at the distal end of the torch body 105. The plasma arc torch can include a ring terminal 135 and cap sensor switch 140.

In some embodiments, the maximum diameter of the torch head 145 is less than about 1.2 inches. In some embodiments, the torch includes a semi-transparent torch sleeve. The cap-on sensor switch 140 can be a safety feature indicating whether a retaining cap 130 has been fastened to the body of the torch 105. In some embodiments, the cap-on sensor switch 140 is RoHS (Restriction of Hazardous Substances Directive) compatible. In some embodiments, the plasma arc torch 100 includes an electrical power ring-terminal 135 connection to the torch body 105. The electric power ring terminal 135 can permit current to pass when the retaining cap 130 has been fastened to the body of the torch 105.

In some embodiments, the main power connection is a ring terminal 135 that is bolted to the torch head and electrical connection to the electrode 110 is made with a circumscribing radial spring element 150. The circumscribing radial spring element 150 can be a commercially available LOUVERTAC high current electrical contact. In some embodiments, the main power connection does not move axially as in previous contact-start torch designs. The plasma arc torch 100 can be a contact-start plasma cutting torch that includes a fixed internal torch body 105. In some embodiments, the plasma arc torch includes a replaceable, fixed in place circumscribing radial spring element 150 (e.g., LOUVERTAC electrical contact) and a gas pressure actuatable electrode with a spring return. The electrode 110 can move relative to a fixed circumscribing radial element 150 (e.g., LOUVERTAC contact), resulting in a wiping action of the circumscribing radial element 150 on the electrode 110 each time the torch is actuated. The electrode actuation can be accomplished via gas pressure and the electrode return can be accomplished via a push-rod 155 and spring 160 fixed in the torch body 105. The springs 160 can return the electrode 110 to the original position on the nozzle 115 when the gas pressure is removed.

In some embodiments, the plasma arc torch 100 is a high current, substantially gas-cooled (e.g., cooled without liquid coolant) plasma arc torch. The plasma arc torch 100 can be an air-cooled torch. The gas can also include oxygen or nitrogen in various other ratios. In some embodiments, the nozzle 115, shield 120, electrode 110, torch body 105, or any combination thereof, includes a cooling gas flow channel 165A-165D defined by at least one fin. In some embodiments, the cooling gas flow channels 165A-165D are spiral groove heat exchangers defined by a spiral groove fin. The shield 120 can include a generally hollow conductive body and a cooling gas flow channel 165A defined by at least one fin disposed about an exterior surface of the body, the body providing a thermal conductive path that transfers heat between the shield 120 to the cooling gas flow channel 165A during operation of the torch 100. The shield 120 can include swirl retarding vent ports (not shown). The nozzle 115 can include a generally hollow conductive body and a cooling gas flow channel 165B defined by at least one fin disposed about an exterior surface of the body, the body providing a thermal conductive path that transfers heat between the nozzle to the cooling gas flow channel during operation of the torch. The plasma arc torch 100 can include an internal electrical contact surface 170 (e.g., electrode LOUVERTAC connection) adjacent an exterior cooling gas flow channel 165C on the electrode 110. The torch body 105 can include at least one spiral groove cooling fin 165D and an electrode return plunger 155 and spring 160.

A swirl ring 125 can also allow segregation of plasma and cooling/actuation gas flows within the torch, including different gas sealing techniques. External segregation of these flows can also be included. The swirl ring 125 can be isolated and protected from physical deformation.

In some embodiments, the “consumable” parts of a plasma arc torch (e.g., nozzle 115, shield 120, electrode 110 etc.) are held in place by the retaining cap 130. The retaining cap 130 can have a distal portion that is electrically isolated and contacts the shield 120. In some embodiments, the retaining cap 130 includes an electrically isolated portion that contacts the nozzle and a threaded portion. The nozzle contact portion and the threaded portion can be held and aligned by an electrically insulating sleeve portion. The retaining cap 130 can include a flange 175 disposed relative to the distal portion where the flange 175 can firmly clamp the consumables (e.g., nozzle 115, shield 120, etc.) on to the torch body 105. An interior surface of the flange 175 can be disposed adjacent to the cooling gas flow channels 165A-B (e.g., spiral groove flow channels) on the nozzle 115 and shield 120 assembly. In some embodiments, an interior surface of the flange 175 is in contact with a cooling gas flowing through a cooling gas flow channel 165A-B in the nozzle 115 and shield 120 assembly. In some embodiments, the cooling gas flowing in a channel 165A-B generates a pressure drop across a nozzle 115 and/or shield 120, cooling the nozzle 115 and/or shield 120. In this embodiment, a pressure drop of a gas (e.g., cooling gas) flowing through the torch is disposed relative to the cooling gas flow channels 165A-B of the nozzle 115 and/or shield 120, whereas previous designs include a pressure drop relative to the retainer cap of the plasma arc torch (see e.g., U.S. Pat. No. 6,084,199, the contents of which are incorporated herein by reference in their entirety and which is assigned to Hypertherm, Inc. of Hanover, N.H., the owner of the present invention).

Figure 2:
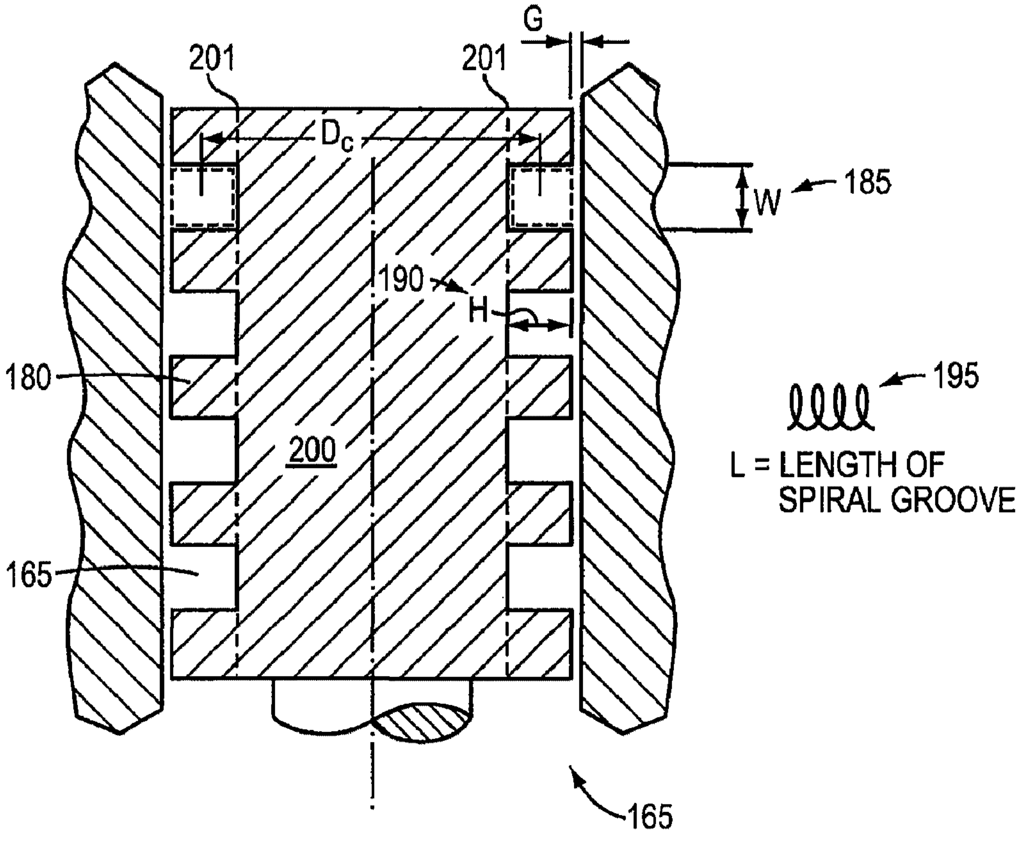
FIG. 2 is a schematic of a cooling gas flow channel, according to an illustrative embodiment.

FIG. 2 is a schematic of a cooling gas flow channel 165, according to an illustrative embodiment. The cooling gas flow channel 165 can be defined by at least one fin 180. In some embodiments, a consumable (e.g., a nozzle 115, shield 120, electrode 10 or any combination thereof) can include a cooling gas flow channel 165. In some embodiments, a torch body can also include a cooling gas flow channel 165. The cooling gas flow channel 165 can include a width 185, a height 190 and a length 195 dimensioned to establish sufficient heat transfer from the consumable to a cooling gas flow channel 165 during operation of the torch to prevent failure of the consumable. In this embodiment, the cooling gas flow channel 165 is defined by a fin 180 and is a spiral groove heat exchanger where the length 195 of the cooling gas flow channel 165 is the length of the spiral groove.

The fin 180 defining the cooling gas flow channel can have a height 190 greater than width 185. In some embodiments, the height 190 is substantially more than about half of the width 185. The fin can direct and/or force a greater amount of the gas to flow in the channel and can allow a lesser amount of gas to flow over the fin 180. A long, thin fin shape can provide advantageous heat transfer characteristics, such as increased heat transfer capacities. Embodiments include configurations in which the distance between adjacent fins is significantly greater than a thickness of the fins, e.g., where the separation between fins is two times, five time, or even more, greater than a thickness of a fin.

In some embodiments, the consumable or torch body includes a conductive body 200, wherein the cooling gas flow channel is disposed about an exterior surface 201 of the conductive body 200. The exterior surface 201 of the conductive body 200 can be defined by the base of the fin 180. The conductive body 200 can have a wall thickness (not shown) sufficient to provide a thermal conductive path that transfers sufficient heat from the conductive body 200 to a cooling gas flow channel 165 during operation of the torch to prevent failure of the consumable or torch body during operation of the torch.

A cooling gas flow channel 165 can be configured to prevent failure of the consumable during operation of the torch and extend a life of the consumable. As a cooling gas flows through the channel 165, the velocity of the gas is decreased (i.e., the velocity of the gas flow at the inlet of a channel 165 is greater than the velocity of the gas flow at the outlet of a channel 165). Generally, a higher velocity of a gas flow can correspond to increased cooling capabilities and similarly, a lower velocity of a gas flow can correspond to decreased cooling capabilities.

One way to accommodate for a decreased velocity in the gas flow is to increase a pressure of the gas flow (i.e., increase pressure drop across the consumable). In some embodiments, more than one gas source can be used for different parts of the torch, as different components of a plasma arc torch can require different optimal pressure operating conditions.

In some embodiments, one gas source is used for the plasma arc torch, limiting the pressure drop across a consumable of a plasma arc torch. For example, the nozzle 115 and/or shield 120 may be able to accommodate a higher pressure gas source (e.g., 120-150 psig) than the pressure in a plasma chamber (e.g., 60 psig). For embodiments using only one gas source, the pressure drop available across the nozzle 115 and/or shield 120 would thus be limited. Applicants learned that a lower gas supply pressure results in a lower heat transfer coefficient between the cooling gas and the conductive surface (e.g., ⅓ of the heat transfer coefficient as compared with gas sources at higher pressures, e.g., 150 psig). However, Applicants have determined that the cooling gas flow channel 165 can be configured to provide sufficient heat transfer from the conductive body 200 of the consumable and/or torch body to prevent failure during operation of the torch. Previously, it was unknown that pressure drop and surface area configurations existed that could be used to prevent failure, e.g., of the consumables during operation of the torch with only gas cooling (e.g., air cooling).

In embodiments where a pressure of the supply gas is predetermined or is not desirable to be manipulated or increased, a cooling gas flow channel 165 can also be designed/configured to compensate for decreased velocity in the gas flow while compensating for a predetermined gas flow pressure. The cooling gas flow channel 165 can be designed to increase a surface area in contact with the cooling gas flow, thereby compensating for a lower heat transfer coefficient while still providing sufficient cooling of the consumable and/or torch body to prevent failure during operation of the torch. In some embodiments, the cooling gas flow channel 165 is defined by a fin 180 that is helical, wrapping around the conductive body 200 by more than 360 degrees, which can also be extended to form a spiral groove. In some embodiments, e.g., the spiral groove, directs a cooling gas to flow or rotate one or more times around the conductive body 200 (e.g., generates a non-axial, tangential component to the gas flow and/or forces the gas to flow concentrically around the conductive body 200). In some embodiments, the gas flows circumferentially around the conductive body 200.

Figure 3:
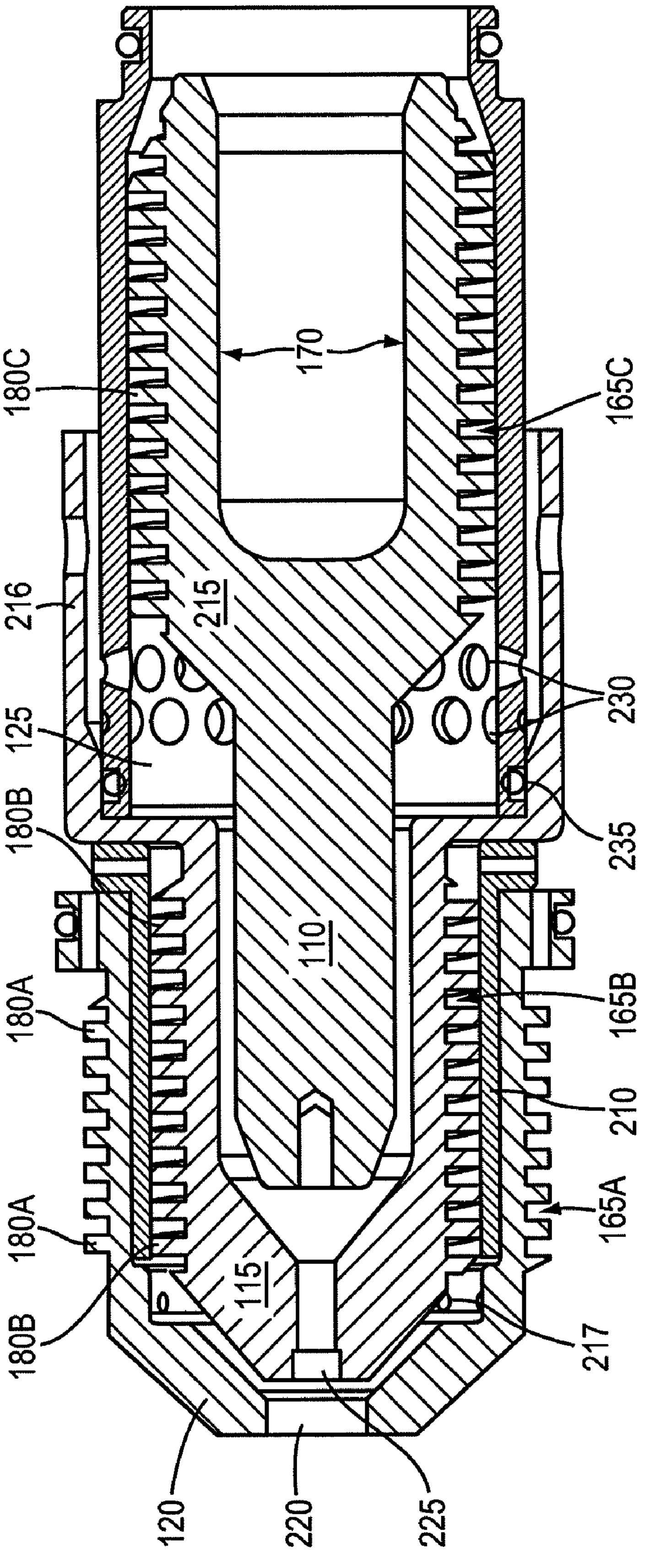
FIG. 3 is a sectional view of a stack-up of consumables for a plasma arc torch, according to another illustrative embodiment.

FIG. 3 is a sectional view of a stack-up of consumables (e.g., electrode 110, nozzle 115, and shield 120) for a plasma arc torch, according to another illustrative embodiment. At least one fin 180A-C defining a cooling gas flow channel 165A-C can be disposed relative to the nozzle 115, shield 120, electrode 110 or any combination thereof. In some embodiments, the at least one fin 180A-C defining the cooling gas flow channel 165A-C can be a cooling fin having substantial heat transfer area, enhancing the ability to cool the nozzle 115, the shield 120, the electrode 110, torch body 105, or any combination thereof. In some embodiments, the nozzle 115 and shield 120 are electrically isolated from each other by an isolator part 210, the isolator part 210 comprising an electrically insulating material.

The electrode 110 can include a body 215 and a cooling gas flow channel 165C defined by at least one fin 180C disposed on an exterior surface of the body 215. The electrode 110 can include an internal electrical contact surface 170 adapted to interact with a circumscribing radial spring element (e.g., LOUVERTAC electrical contact). In some embodiments, the cooling gas flow channel 165C is defined by at least one fin 180C, which can be a spiral groove cooling fin. In some embodiments, the cooling gas flow channel 165C is disposed on an outer surface of the electrode body 215 and an electrical contact surface 170 is disposed on an interior surface, allowing for direct cooling of the electrical contact surface 170. In some embodiments, the electrode body 215 includes a cylindrical electrode body including a spiral groove cooling fin disposed relative to an exterior cylindrical surface and an electrode current contact area adjacent the cooling fin on an interior cylindrical face.

The nozzle 115 of the plasma arc torch can include a cooling gas flow channel 165B defined by at least one fin 180B. The nozzle 115 can be a spiral groove nozzle that includes at least one spiral groove cooling fin on its exterior surface (e.g., a cylindrical face). In some embodiments, the nozzle 115 includes a perforated flange area 216 that makes electrical contact with and aligns with the torch body.

The shield 120 can be disposed relative to a nozzle 115 for a plasma arc torch. In some embodiments, the shield 120 is a spiral groove shield including at least one spiral groove cooling fins on an exterior (e.g., cylindrical) face. In some embodiments, the nozzle 115 is a spiral groove nozzle 115 and the shield 120 is a spiral groove shield separated by an electrically isolating part 210 with flow metering ports. In some embodiments, there is no isolating part 210 disposed between the nozzle 115 and the shield 120, and a gap between the nozzle 115 and shield 120 is adjusted/designed so that the gas flowing through the cooling gas flow channel 165B flows through the channel 165B and over the tips of the fins 180B. A gas flowing over the fins 180B can generate turbulence in the gas flow, and enhance cooling of the nozzle 115 and shield 120. In some embodiments, the fins 180B disposed on an exterior surface of the nozzle 115 and defining a cooling gas flow channel 165B face an interior surface of the shield 120. The interior surface of the shield 120 can, in some embodiments, have fins (not shown) or features (not shown) that are interleaved or face the fins 180B on the nozzle 115.

In some embodiments, the shield 120 includes a port 217 that creates an exit flow counter to a swirling motion of the shield gas flow, thereby dampening the swirling motion of the shield gas flow exiting the orifice 220 of the shield 120. The port on the shield 120 can off-set a swirling flow from the nozzle 115. The ports 217 (e.g., vents) can vent a cooling gas (e.g., shield gas) that cools the nozzle 115 and flows between the nozzle 115 and the shield 120. The cooling gas can flow by following a cooling gas flow channel 165B (e.g., a spiral groove) disposed on an exterior surface of the nozzle 115. This swirling flow from the cooling gas can pick up heat from the nozzle 115 and the shield 120. The swirling flow can be partially vented by the port 217 disposed relative to the shield 120. In some embodiments, the ports 217 on the shield 120 are off-set circumferentially. By having the ports 217 off-set circumferentially, the swirling component of the cooling gas flow can be retarded, causing the remaining gas flow that does not exit the port (e.g., the non-vented flow) to flow along a more axial flow path. The remaining gas flow that does not exit the port in the shield 120 can exit the nozzle 115 near the plasma orifice 225 producing a 'co-axial' flow (e.g., a flow that has a substantially axial flow, having minimal or no swirling flow). "Co-axial flow" can be beneficial for producing a quality metal cut.

In some embodiments, the plasma arc torch can include a swirl ring 125 which produces a swirling flow of a magnitude which produces a plasma jet which is extended by the 'co-axial' flow exiting the shield 120. The swirl ring 125 can include off-set ports 230 and seals 235 which direct the flow at a desired swirling rate. The swirl ring 125 can 'float' axially, eliminating the possibility of distortion caused by clamping forces.

A gas flowing through the plasma arc torch can be provided by one or more gas sources. In some embodiments, the consumables in the plasma arc torch can have a comparable pressure drop. The consumables in the plasma arc torch can have a common gas supply pressure. For example, in some embodiments, a plasma arc torch having a gas source may have a pressure drop of approximately 60 psi. In other embodiments, different components of the torch can operate at differing pressure conditions. For example, a plasma arc torch can have a one gas source pressure for the electrode and a different gas source pressure for the cooling gas that supplies the nozzle 115 and/or shield 120. The nozzle 115 and/or shield 120 can accommodate a pressure drop from a gas source, e.g., at 120-150 psig, while other consumables in the torch (e.g., electrode 110, swirl ring 125) can accommodate a pressure drop from a different gas source at a lower pressure (e.g., 60 psig).

The consumables (e.g., nozzle 115, shield 120, electrode 110, swirl ring 125, etc.) in a plasma arc torch can be designed to accommodate and/or manipulate the gases flowing throughout the torch while also accommodating the pressure drop across the respective consumables. For example, any one of the consumables can include a cooling gas flow channel 165A-D to use the gas flow to cool the consumable and prevent failure of the consumable during operation of the torch. The shield 120 can include ports for affecting the flow of a gas exiting the plasma arc torch. An isolator part 210 can be disposed between the shield 120 and nozzle 115 to meter the gas flow with ports to affect a pressure of the gas flow. The swirl ring 125 can include ports or metering holes to direct a plasma gas flow and affect a pressure drop of a gas flowing in the torch. The swirl ring 125 can also include a flow choke portion (not shown) depending on the pressure of the plasma gas. For example, if the pressure of the plasma gas from the source is higher than a desired pressure level in the plasma chamber, the swirl ring can include a flow choke portion (not shown) to affect the pressure drop across the swirl ring 125, thereby affecting a pressure in the plasma chamber of the torch.

Figure 4A:
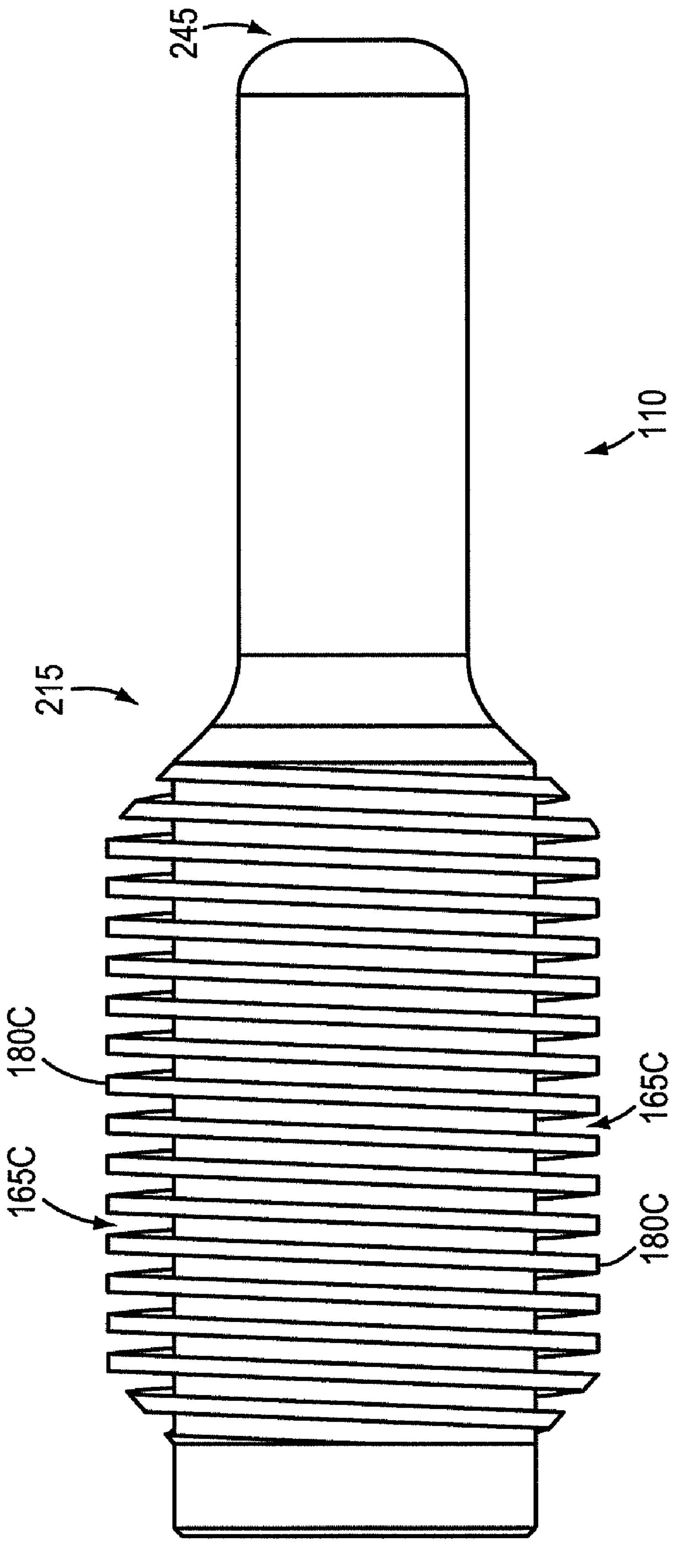
FIG. 4A is a three-dimensional drawing of an electrode for a plasma arc torch, according to an illustrative embodiment.
Figure 4B:
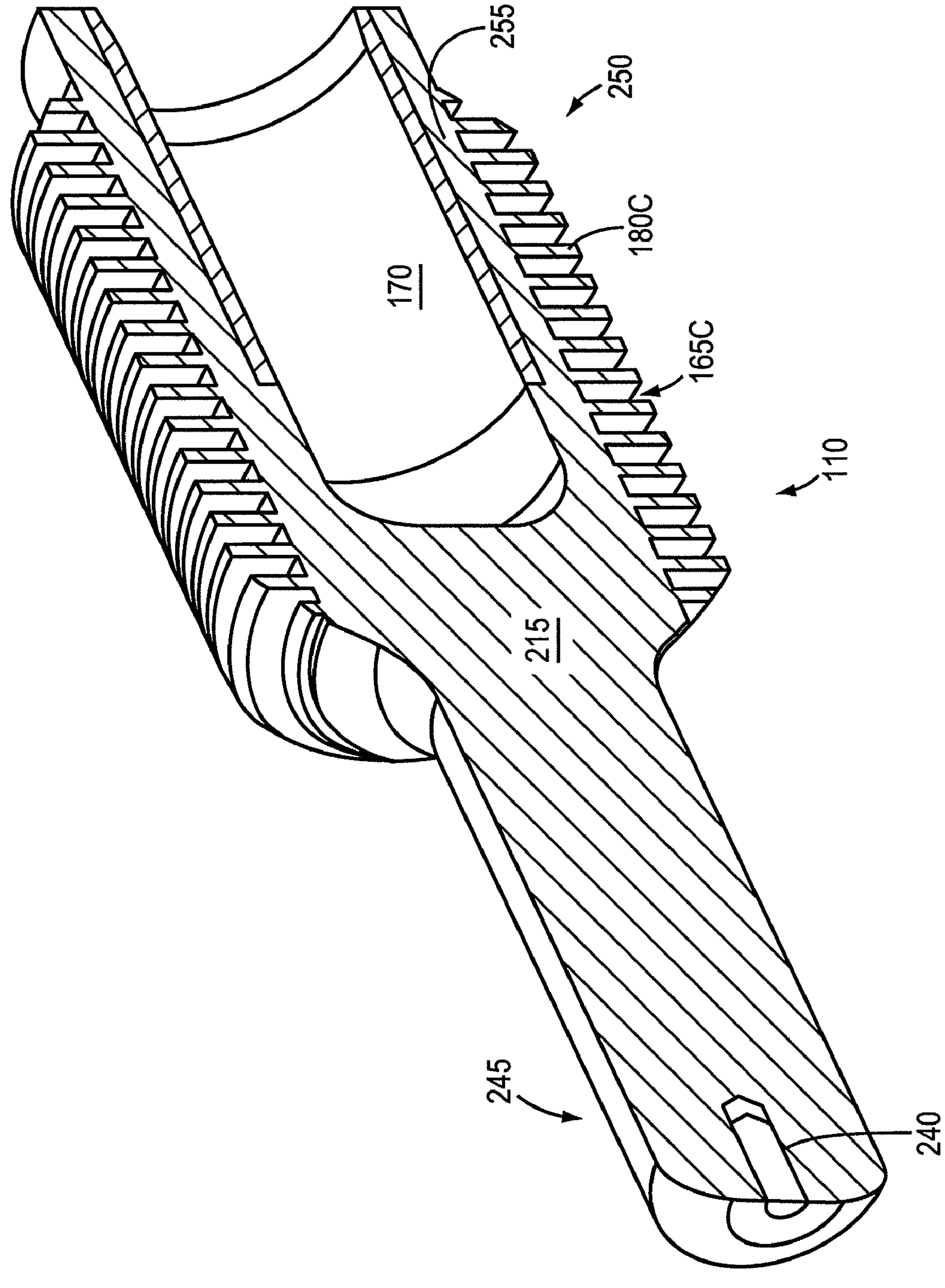
FIG. 4B is a cross-sectional view of the electrode of FIG. 4A.

FIGS. 4A and 4B are three-dimensional drawings of an electrode 110 for a plasma arc torch, according to an illustrative embodiment. The electrode 110 can include an elongate electrode body 215 and a high thermionic emissivity material 240 (e.g., electron emitting element) disposed at a distal end of the electrode body 245. The electrode 110 also can include an internal electrical contact surface 170 at a proximal end of the electrode body 250, the internal electrical contact surface 170 sized to receive a circumscribing radial spring element 150. The electrode 110 also can include an external gas cooled surface including a cooling gas flow channel 165C defined by a fin 180C, the external gas cooled surface disposed opposite the internal electrical contact surface 170. A wall thickness 255 between the internal electrical contact surface 170 and the gas cooled surface can be sized to transfer sufficient heat to the cooling gas flow channel 165 during operation of the torch. In some embodiments, sufficient heat is transferred to prevent failure of the electrode 110 during operation of the torch. In some embodiments, the electrode 110 includes an electrode base made of a conductive material (e.g., copper).

In some embodiments, the electrode 110 includes an electrical contact surface (e.g., electrode current contact surface). The electrical contact surface can be an internal electrical contact surface 170. The electrical contact surface 170 can be disposed on an interior surface of the electrode and adjacent a fin 180C defining a cooling gas flow channel 165C. The cooling gas flow channel 165C can be disposed an exterior surface of a body of the electrode 215 can be defined by at least one fin 180C disposed on an external surface of the body 215 (e.g., a spiral groove cooling fin disposed on an exterior surface). In some embodiments, the cooling gas flow channel 165C comprises a spiral groove disposed on an external surface of the electrode 110. A gas flowing through the cooling gas flow channel 165C can flow in a direction towards the proximal end of the electrode body 250. In some embodiments, the electrode 110 has a cylindrical body and a spiral groove cooling fin is disposed on an exterior cylindrical face immediately adjacent at least one cooling fin disposed on an interior cylindrical face. In some embodiments, the cooling gas flow channel 165C can be supplied by more than one gas source.

The cooling gas flow channel 165C can include a width, a height and a length dimensioned to establish a pressure drop that results in sufficient heat transfer from the electrode 110 to a cooling gas flow channel 165C during operation of the torch. In some embodiments, the internal electrical contact surface 170 is conductively cooled by a cooling gas flow.

Figure 4C:
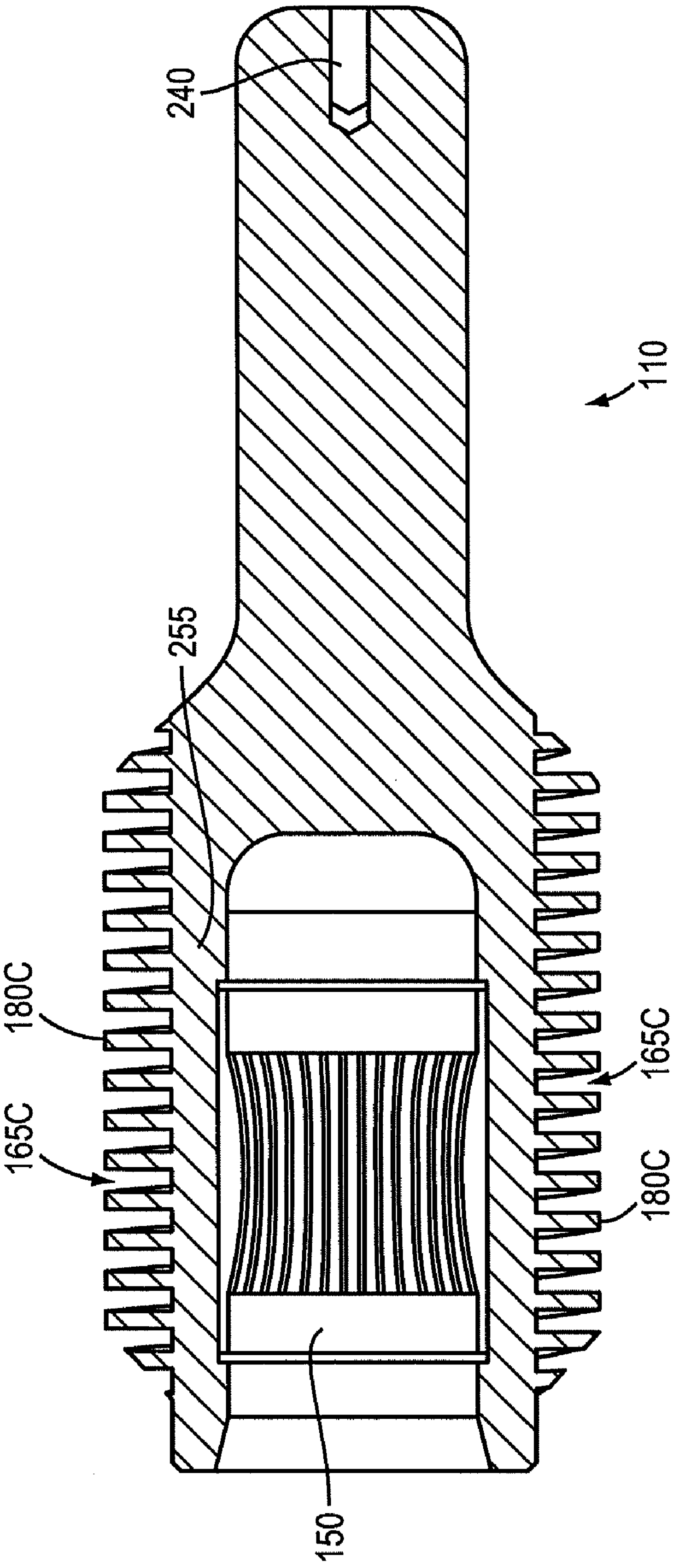
FIG. 4C is a cross-sectional view of the electrode of FIG. 4A in communication with a circumscribing radial spring element, according to an illustrative embodiment.

FIG. 4C is a cross-section of the electrode 110 of FIGS. 4A-B receiving a circumscribing radial spring element 150. The electrical contact surface 170 can be an interface for an electrical contact. The electrical contact surface 170 can be formed to allow an axially sliding electrical contact. In some embodiments, an electrical contact is free to move axially within the electrode current contact surface 170, while making intimate electrical contact with the electrical contact surface 170. The electrical contact can be a circumscribing radial spring element 150 (e.g., a LOUVERTAC contact, commercially available from the TYCO company). In some embodiments, the internal electrical contact surface 170 is sized to center the circumscribing radial spring element 150. The internal electrical contact surface 170 can include a feature (not shown) to retain the circumscribing radial spring element 150 within a bore that is at least partially defined by the internal electrical contact surface 170. A ratio of a diameter of the internal electrical contact surface 170 to a length of the internal electrical contact surface 170 can be less than about ⅔. The internal electrical contact surface 170 can have a length that is not more than about three times the diameter of the internal electrical contact surface 170. In a preferred embodiment, the length is approximately 0.6-0.8 inches and the diameter is approximately 0.3 inches. In some embodiments, the electrical contact surface 170 can be designed and configured as a receptacle (e.g., an interior cylindrical surface forming the electrical contact surface to the electrode) or a bore.

In some embodiments, the circumscribing radial spring element 150 can require approximately 3-6 pound force to make the circumscribing radial spring element 150 slide over the electrical contact surface 170. In some embodiments, the electrode 110 has an outside diameter sized to produce a force that can move the electrode 110 into operating position when gas pressure is applied. In some embodiments, the force is sufficient to overcome the drag force of the electrical contact 150 and return spring force. A drag force can be generated from a frictional force between the circumscribing radial spring element 150 (e.g., a band on a LOUVERTAC) and the torch body or the internal electrical contact surface 170. The pressure required to overcome the drag force can be approximately 40-80 psi. A cooling gas flow channel 165C defined by at least one fin 180C can be disposed adjacent to the internal electrical contact surface 170. The cooling gas flow channel 165C can be designed to cool the internal electrical contact surface 170 while simultaneously overcoming the frictional drag force of the circumscribing radial spring element 150 and balancing the drag force against the spring return (e.g., the spring 160 return of FIG. 1), such as during pilot arc initiation. In some embodiments, the circumscribing radial spring element 150 can be attached to a pin on the torch body. In some embodiments, the pin on the torch body can be cooled and deliver current to the electrode 110 via the circumscribing radial spring element 150.

In this embodiment, the internal electrical contact surface 170 reacts against the circumscribing radial spring element 150 when installed in the torch. The circumscribing radial spring element 150 can be attached to the torch by a diametric interference fit. In some embodiments, the cooling gas flow channel 165C is dimensioned to provide an amount of pressure drop sufficient to overcome a longitudinal frictional resistance between the internal electrical contact surface 170 and the circumscribing radial spring element 150.

In some embodiments, the internal electrical contact surface 170 includes the circumscribing radial spring element that, when installed in the torch, reacts against an electrical contact surface of the torch. The cooling gas flow channel 165C can be dimensioned to provide an amount of pressure drop sufficient to overcome a longitudinal frictional resistance between the electrical contact surface of the torch and the circumscribing radial spring element relative to an electrode 110. The circumscribing radial spring element can be attached to the internal electrical contact surface by a diametric interference fit.

Figure 5A:
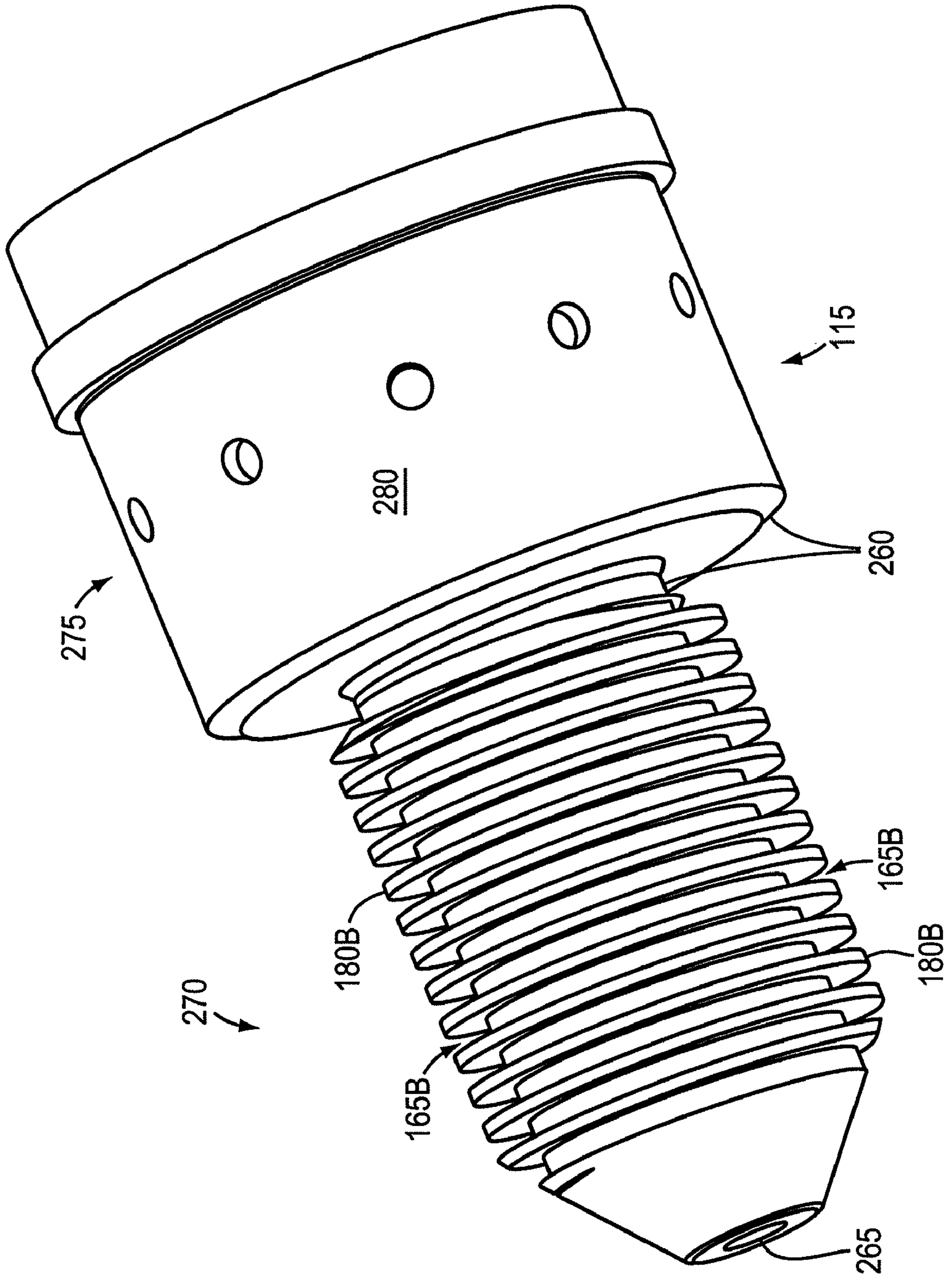
FIG. 5A is a three-dimensional drawing of a nozzle for a plasma arc torch, according to an illustrative embodiment.
Figure 5B:
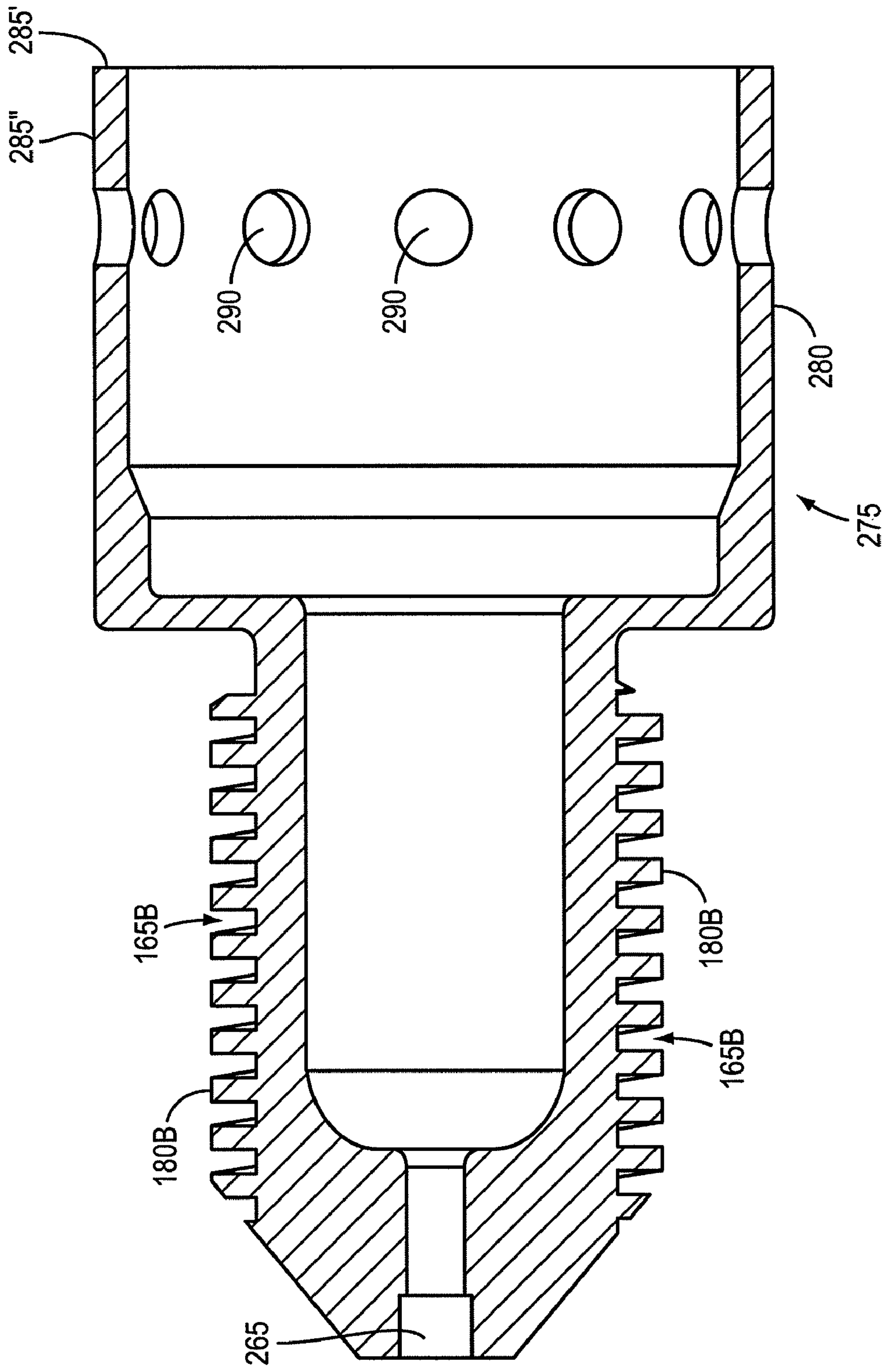
FIG. 5B is a cross-sectional view of the nozzle of FIG. 5A.

FIG. 5A is a three-dimensional drawing of a nozzle 115 for a plasma arc torch, according to an illustrative embodiment. FIG. 5B is a cross-sectional view of the nozzle of FIG. 5A. The nozzle 115 can be made of a conductive material (e.g., copper). The nozzle 115 can have a substantially hollow body 260 capable of receiving an electrode (e.g., the electrode of FIGS. 4A-C). The nozzle 115 can include a body 260, an orifice 265 disposed at an end of the body and a cooling gas flow channel 165B defined by at least one fin 180B disposed about an exterior surface of the body 260. The body 260 can provide a thermal conductive path that transfers heat between the body 260 and the cooling gas flow channel 165B during operation of the torch. In some embodiments, sufficient heat is transferred to prevent failure of the nozzle 115 during operation of the torch.

In some embodiments, the cooling gas flow channel 165B includes a spiral groove disposed on an external surface of the body 260 of the nozzle 115. In some embodiments, the cooling gas flow channel 165B can be supplied by more than one gas source. The cooling gas flow channel 165B can include a width, a height and a length dimensioned to establish sufficient heat transfer from the nozzle 115 to a cooling gas flow channel 165B during operation of the torch.

In some embodiments, the nozzle 115 can include a distal portion 270 (e.g., forward portion) and a proximal portion 275 (e.g., rear portion). The orifice 265 can be disposed on a distal end (e.g., front end of the forward portion) of the distal portion 270 of the nozzle. In some embodiments, the nozzle 115 includes at least fin 180B that can be one spiral cooling fin disposed on an exterior surface of the distal portion 270 of the nozzle 115.

The nozzle 115 can also include a flange 280 disposed relative to the proximal portion 275 of the nozzle 115. The flange 280 can make electrical contact with the torch body on a surface 285' and can also align the nozzle 115 to the torch body on surfaces 285' and 285". In some embodiments, the flange 280 includes a perforated flange area. The body 260 of the nozzle 115 can include a flange 280 that includes at least one port 290 configured to pass at least a portion of a cooling gas flow between the flange 280 and the cooling gas flow channel 165B during operation of the torch. In some embodiments, ports 290 (e.g., perforation holes) direct a cooling gas (e.g., air) from the torch body to the distal portion 270 of the nozzle 115.

In some embodiments, the body 260 of the nozzle 115 is substantially cylindrical (e.g., a cylindrical body) and a spiral groove cooling fin is disposed on an exterior cylindrical face. In some embodiments, a spiral groove cooling fin is configured to extend the cooling surface while maintaining a high speed flow in the channel of the groove, enhancing the cooling of the nozzle. A high speed flow of a cooling gas can produce a relatively high heat transfer coefficient, which enhances cooling.

A method for extending the life of a plasma arc cutting torch can include providing a torch body 105 which includes a plasma gas flow path for directing a plasma gas through a swirl ring 125 to a plasma chamber in which a plasma arc is formed, providing the nozzle 115 (e.g., as described in FIGS. 1, 3 and 5A-B) mounted relative to an electrode (e.g., an electrode as described in FIGS. 4A-C) at a distal end of the torch body 105 to define the plasma chamber and operating the plasma arc cutting torch at an amperage level of at least about 100 Amps.

Figure 6A:
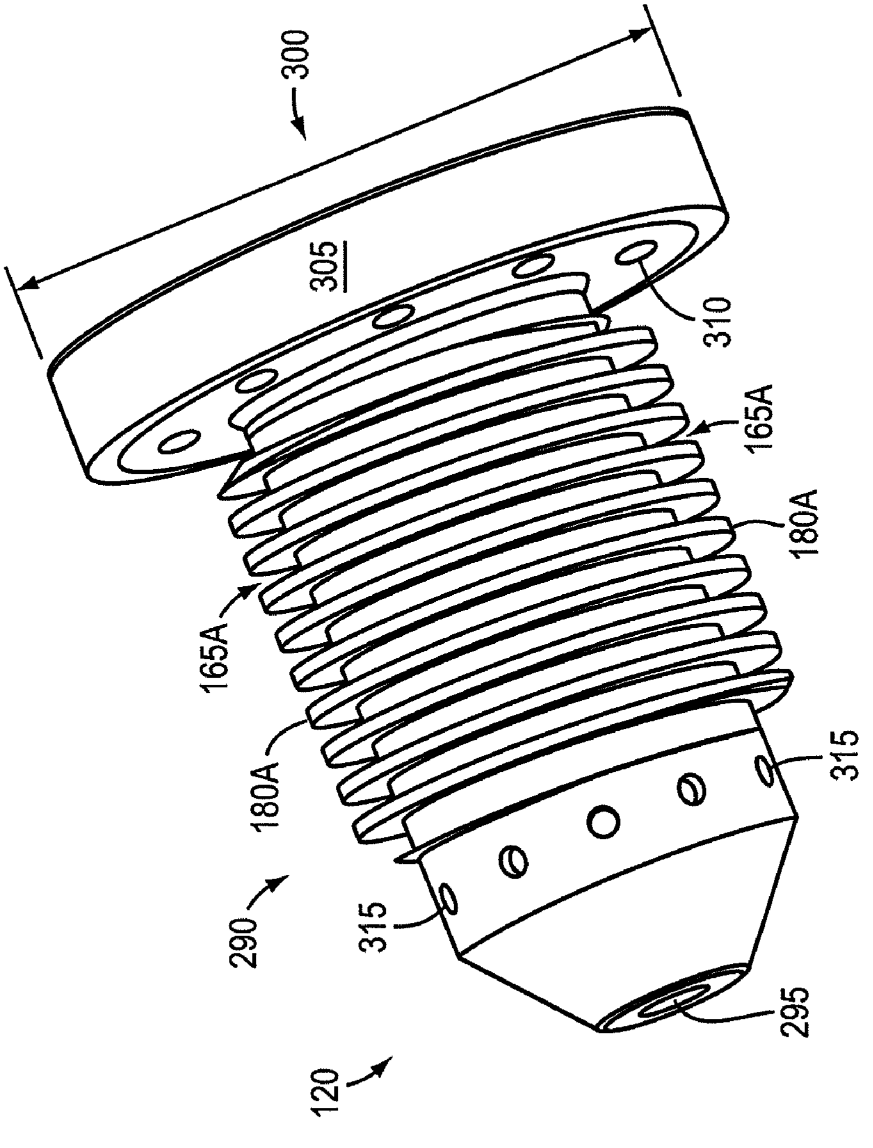
FIG. 6A is a three-dimensional drawing of a shield for a plasma arc torch, according to an illustrative embodiment.
Figure 6B:
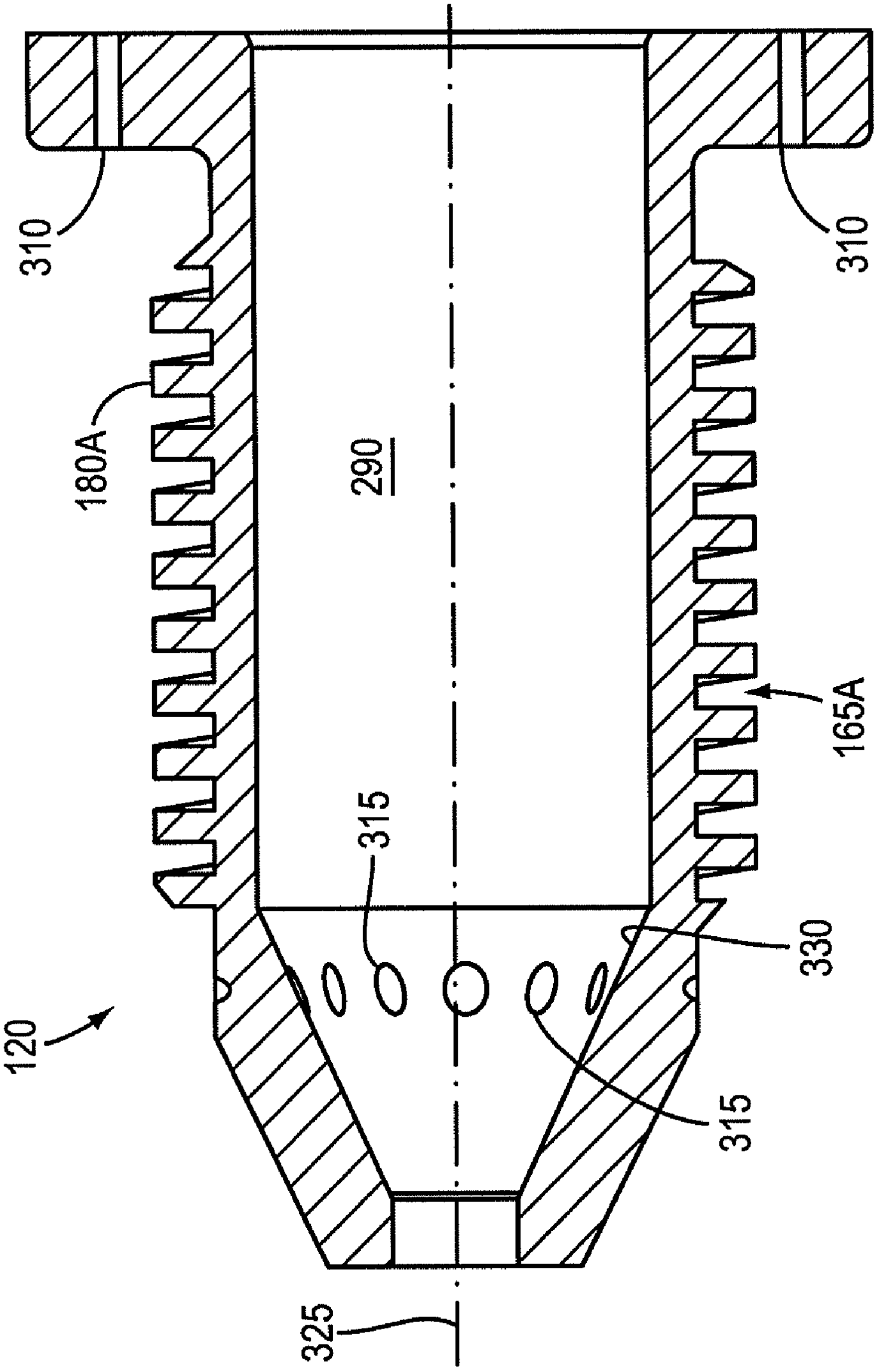
FIG. 6B is a cross-sectional view of the shield of FIG. 6A.

FIG. 6A is a three-dimensional drawing of a shield 120 for a plasma arc torch, according to an illustrative embodiment. FIG. 6B is a cross-sectional view of the shield 120 of FIG. 6A. The shield 120 is capable of protecting a nozzle and can include a body 290 and an orifice 295 disposed at an end of the body 290. The shield 120 can include a cooling gas flow channel 165A defined by at least one fin 180A disposed about an exterior surface of the body 290, the body 290 providing a thermal conductive path that transfers heat between the body 290 and the cooling gas flow channel 165A during operation of the torch. In some embodiments, sufficient heat is transferred to prevent failure of the shield 120 during operation of the torch.

The shield 120 can be made of a conductive material (e.g., copper). In some embodiments, the height 295 of the shield 120 is at least half of the diameter 300 of the body 290.

The cooling gas flow channel 165A can include a width, a height, and a length dimensioned to establish sufficient heat transfer from the shield 120 to a cooling gas flow channel 165A during operation of the torch. In some embodiments, the cooling gas flow channel 165A can be supplied by more than one gas source. In some embodiments, the cooling gas flow channel 165A includes a spiral groove disposed on an external surface of the body 290. In some embodiments, the shield 120 includes at least one spiral groove cooling fin disposed on an external surface of the body 290. In some embodiments, the shield 120 is substantially cylindrical and includes at least one spiral groove cooling fin on its exterior cylindrical face.

The shield 120 can also include a flange 305 that includes at least one port 310, the port 310 configured to pass at least a portion of a cooling gas flow passing between the flange 305 and the cooling gas flow channel 165A during operation of the torch. The port 310 can supply a cooling gas (e.g., air) to the shield 120. In some embodiments, the ports 310 are connected to a cooling gas plenum area in the torch body.

The shield 120 also can include ports 315 that off-set the cooling gas flowing from the nozzle which can be positioned and/or configured to create a more co-axial flow of a cooling gas flowing from the nozzle with respect to a plasma gas flow exiting an orifice of the nozzle. The ports 315 (e.g., bleed ports) can be disposed relative to a distal portion 320 of the shield 120. The shield 120 can include a central longitudinal axis 325 (e.g., a centerline) and an interior surface of the shield 120 can define at least in part a shield gas flow passage and/or shield plenum 330. The shield 120 can include a bleed port 315 off-set from a central longitudinal axis 325 of the shield 120 that creates an exit flow counter to a swirling motion of the shield gas flow, thereby dampening the swirling motion of the shield gas flow exiting the exit orifice 295 of the shield 120. The off-set ports 315 can create a vortex air flow that counters a swirling flow component of the cooling gas exiting from a cooling gas flow channel 165B (e.g., at least one spiral groove cooling fin) from the nozzle 115 and flowing into the shield plenum 330. Dampening a swirling component of the cooling gas flow coming from the nozzle 115 can result in a cooling flow from the nozzle 115 that is more co-axial relative to a plasma gas exiting the orifice of the nozzle 265. A swirling component of a cooling gas flow from the nozzle 115 can interfere with the plasma gas exiting the orifice of the nozzle 265. By substantially dampening the swirling component of the cooling gas flow from the nozzle 115, the ports 315 in the shield can enhance the cut quality of the plasma arc torch.

A method for extending the life of a plasma arc cutting torch can include providing a torch body which includes a plasma gas flow path for directing a plasma gas to a plasma chamber in which a plasma arc is formed and providing a nozzle (e.g., a nozzle as described above in FIGS. 5A-B) mounted relative to an electrode (e.g., an electrode as described above in FIGS. 4A-C) at a distal end of the torch body to define the plasma chamber. The method can also include providing the shield 120 (e.g., as described in FIGS. 6A-B) in a spaced relationship to a nozzle at a distal end of the torch body and operating the plasma arc cutting torch at an amperage level of at least about 100 Amps.

Figure 7:
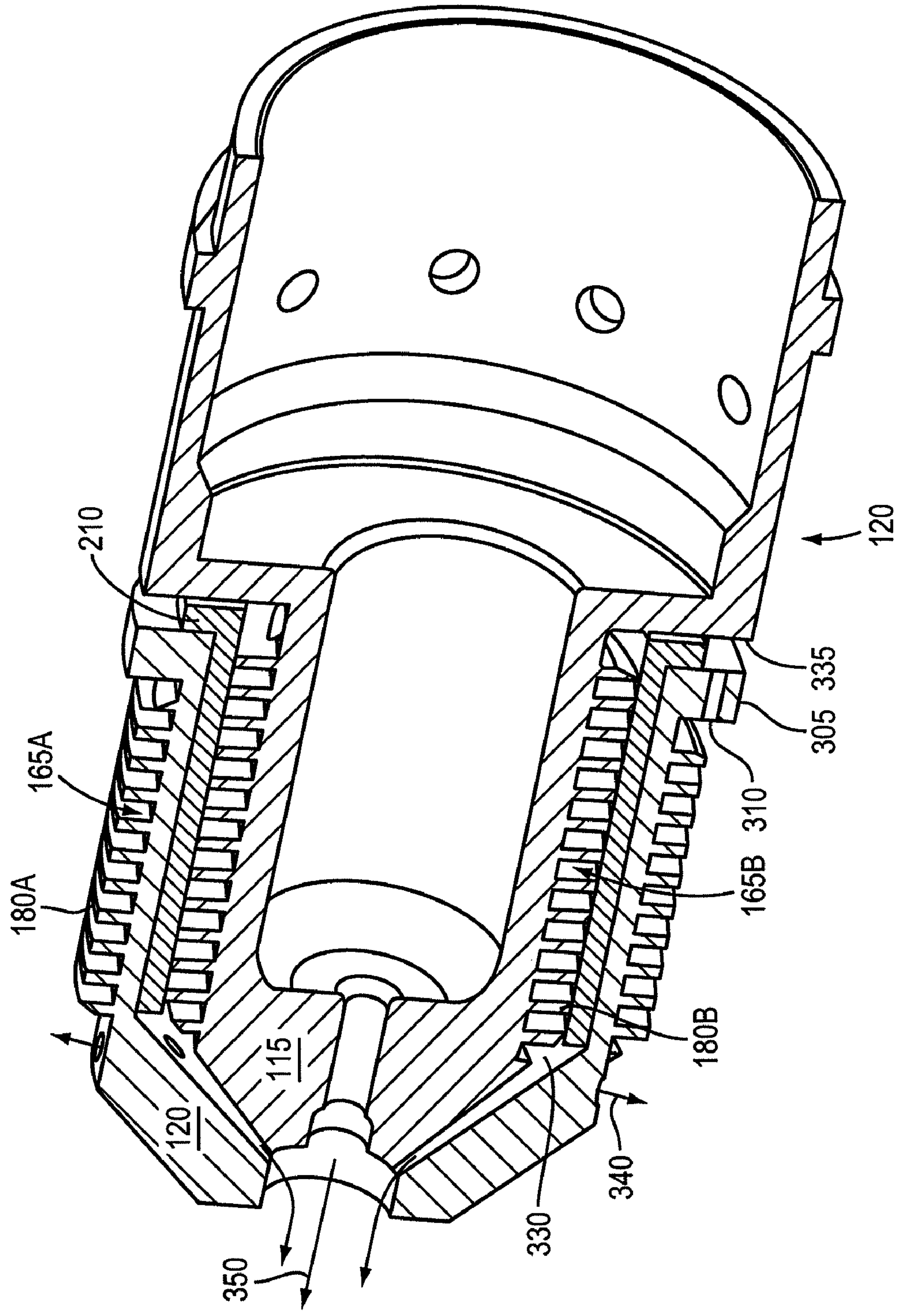
FIG. 7 is a three-dimensional drawing of a nozzle and shield assembly for a plasma arc torch, according to an illustrative embodiment.

FIG. 7 is a three-dimensional drawing of a nozzle and shield assembly for a plasma arc torch, according to an illustrative embodiment. The nozzle can be a nozzle 115 shown in FIGS. 5A and 5B and the shield can be a shield 120 as shown in FIGS. 6A and 6B. In some embodiments, the shield 120 is assembled on to an isolator sleeve 210, which are assembled on to the nozzle 115. The isolator sleeve 210 can be electrically isolating with gas ports for a cooling gas from the nozzle 115. The isolator sleeve 210 can have ports 335 connected to the cooling gas plenum area in the torch body. In some embodiments, the shield 120 has ports 310 connected to the same or a different cooling gas plenum area in the torch body. A cooling gas can pass through ports into the nozzle 115 and shield 120 cooling gas flow channels 165A-B. In some embodiments, the cooling gas flow channels 165A-B on the nozzle 115 or shield 120 are spiral cooling grooves.

In some embodiments, the nozzle 115 and shield 120 assembly produces a substantially co-axial flow exiting the nozzle orifice 265. In some embodiments, a portion of the cooling gas flow 340 from the nozzle 115 exits the shield plenum area through the ports 315 (e.g., off-set by-pass holes or ports) in the shield 120. The reminder of the cooling gas flow 345 from the nozzle 115 and the plasma gas flow 350 from the orifice of the nozzle 265 can exit the torch in a substantially co-axial manner.

Figure 8A:
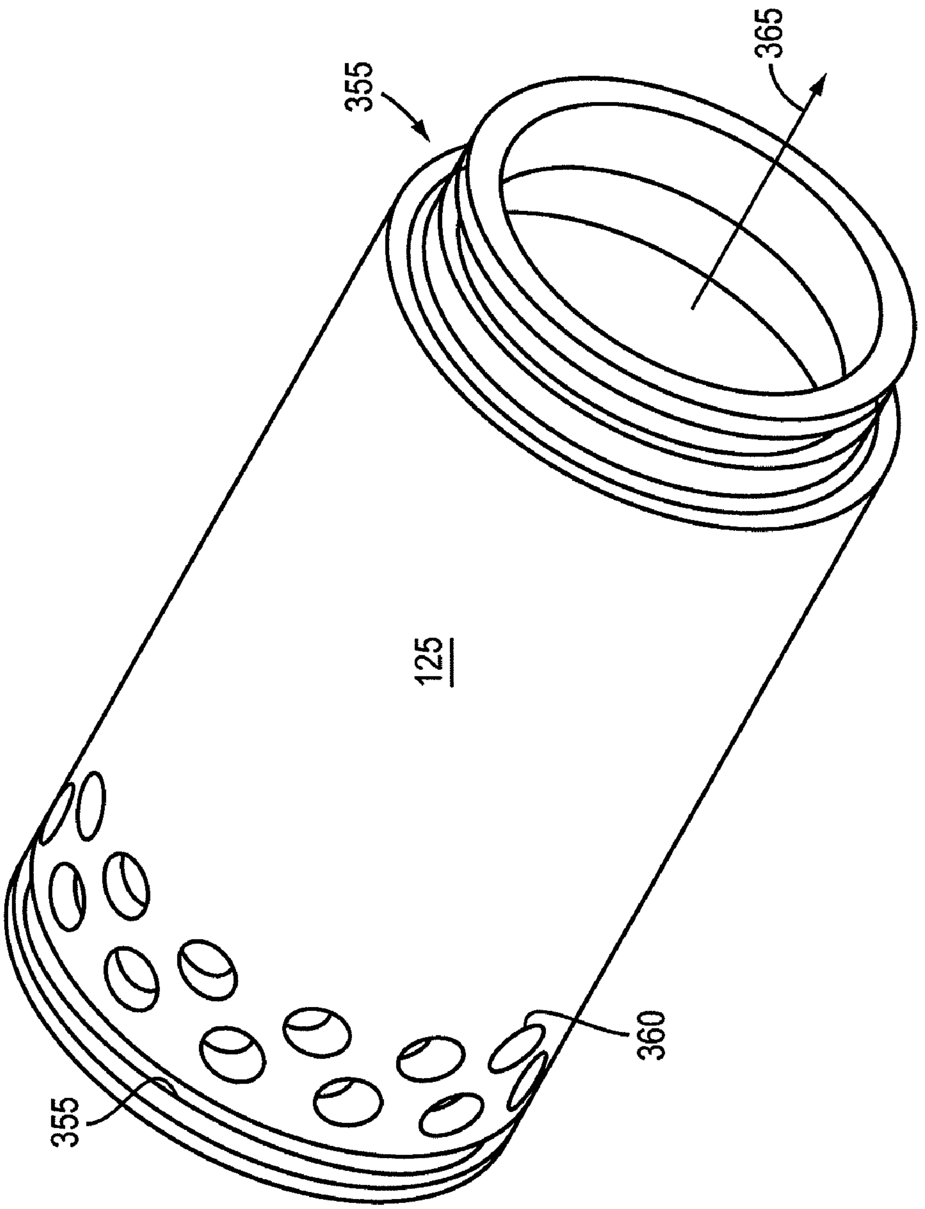
FIG. 8A is a three-dimensional drawing of a swirl ring for a plasma arc torch, according to an illustrative embodiment.
Figure 8B:
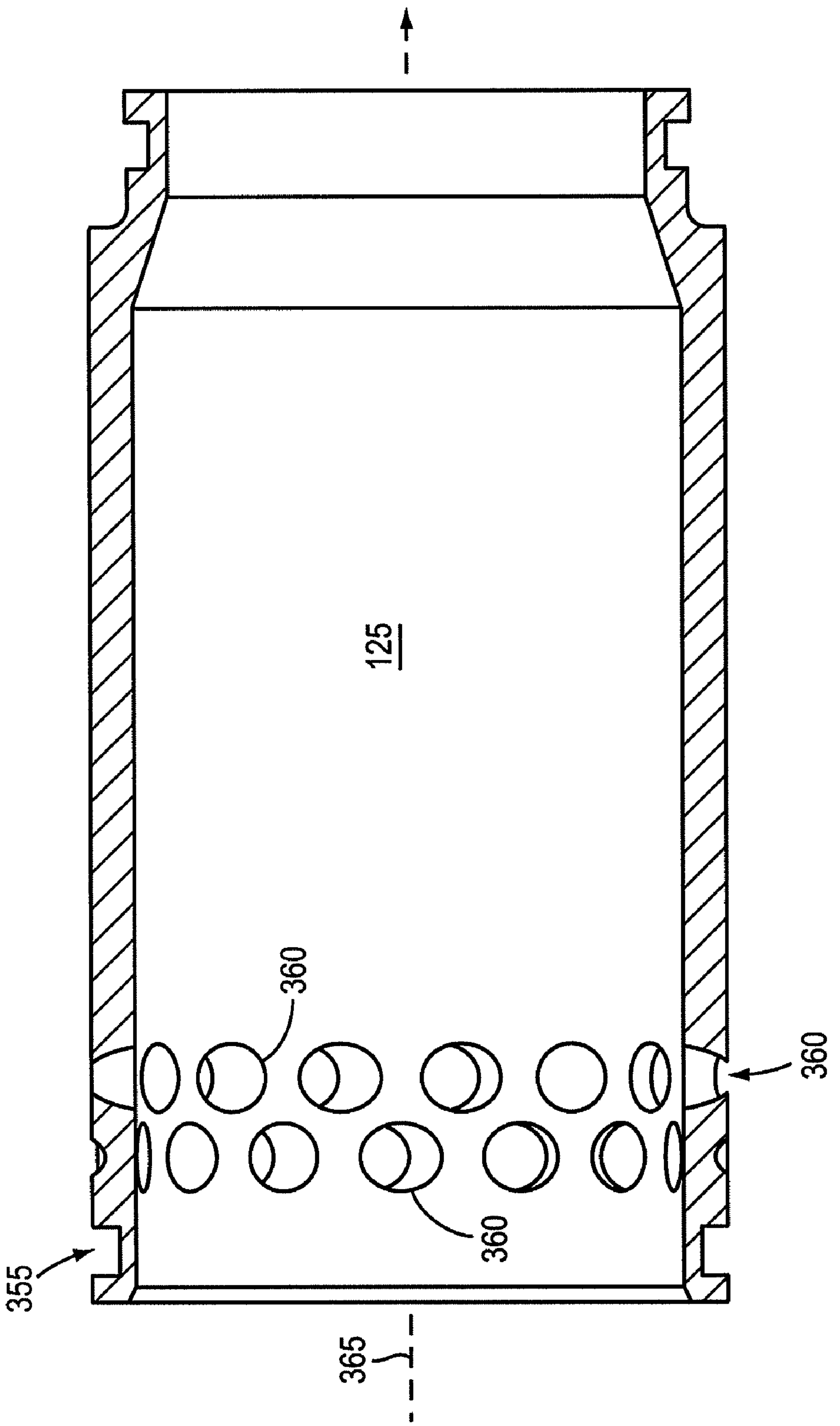
FIG. 8B is a cross-sectional view of the swirl ring of FIG. 8A.

FIG. 8A is a three-dimensional drawing of a swirl ring 125 for a plasma arc torch, according to an illustrative embodiment. FIG. 8B is a cross-sectional view of the swirl ring of FIG. 8A. The swirl ring 125 can include a sealing assembly 355 (e.g., sealing o-ring areas) and can also include ports 360 (e.g., off-set swirl holes). In some embodiments, the ports 360 produce a swirling plasma gas flow that aids in stabilizing the plasma arc. The ports 360 can be off-set relative to a longitudinal axis of the swirl ring 365 and/or a longitudinal axis with respect to the other consumables (e.g., electrode, shield, nozzle, etc.) and sized to produce a swirling flow having a magnitude and/or direction that produces a plasma jet extended by the 'co-axial' flow of the nozzle cooling flow.

The swirl ring 125 can also include a sealing assembly 355 (e.g., gas seals) that allow the swirl ring to 'float' axially which can substantially eliminate the possibility of distortion caused by clamping forces. In some embodiments, the swirl ring 125 is sealed so that the flow entering the ports 360 either passes through cooling gas flow channel 165B-C disposed relative to the electrode 110 or the nozzle orifice 265. A sealing assembly 355 can be disposed at a distal portion of the swirl ring 125. In some embodiments, the sealing assembly 355 includes an o-ring that seals the swirl ring 125 to the nozzle 115. In some embodiments, a sealing assembly 355 can be disposed at a proximal end by o-ring that seals the swirl ring 125 to the torch body 105. The swirl-ring 125 can be free to move in the axial direction, avoiding distortion caused by clamping forces.

Figure 9:
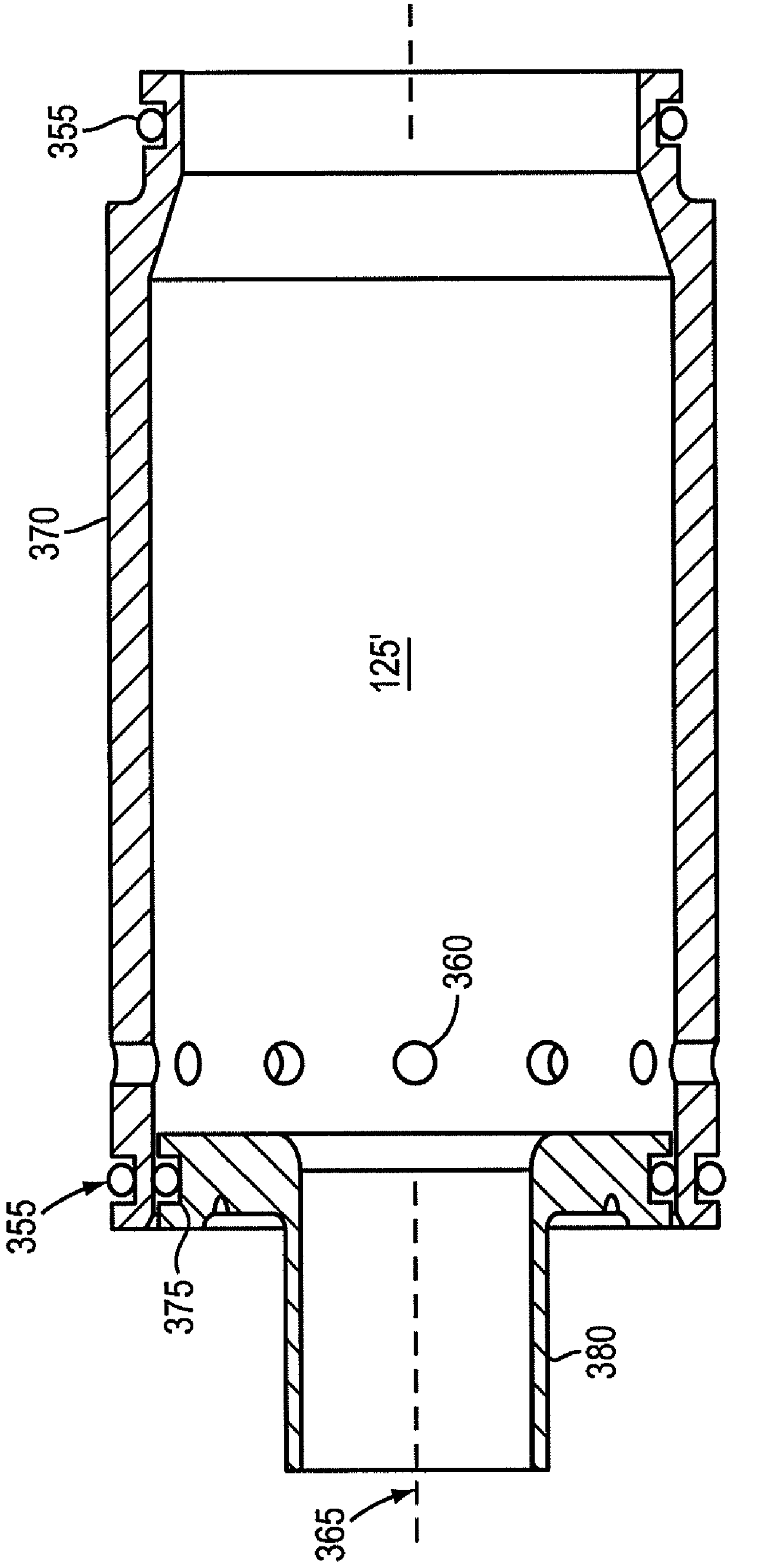
FIG. 9 is a sectional view of a plasma gas flow choke of a swirl ring for a plasma arc torch, according to an illustrative embodiment.

FIG. 9 is a sectional view of a plasma gas flow choke of a swirl ring 125' for a plasma arc torch, according to an illustrative embodiment. The swirl ring 125' can include a body 370 and a plasma gas flow choke 375. In some embodiments, the flow choke 275 has an indentation (not shown) and at least one port (not shown) to meter the flow of a plasma gas. In some embodiments, the plasma gas flow choke 375 includes sealing assembly 355 (e.g., o-ring) and a choke tube portion 380. The sealing assembly 355 can form a gas tight seal against the interior wall of the swirl ring body 370.

The swirl ring body 370 can also include sealing assembly 355 and ports 360 (e.g., off-set swirl holes). The ports 360 can produce a swirling plasma gas flow which helps stabilize the plasma arc. The diameter of the ports 360 can be sized and position offset relative to a longitudinal axis 365 of the swirl ring 125' and/or a longitudinal axis with respect to the other consumables (e.g., electrode, shield, nozzle, etc.) to produce swirling plasma gas flow having a magnitude that produces a plasma jet which is extended by the 'co-axial' flow of the cooling gas flow from the nozzle.

Figure 10A:
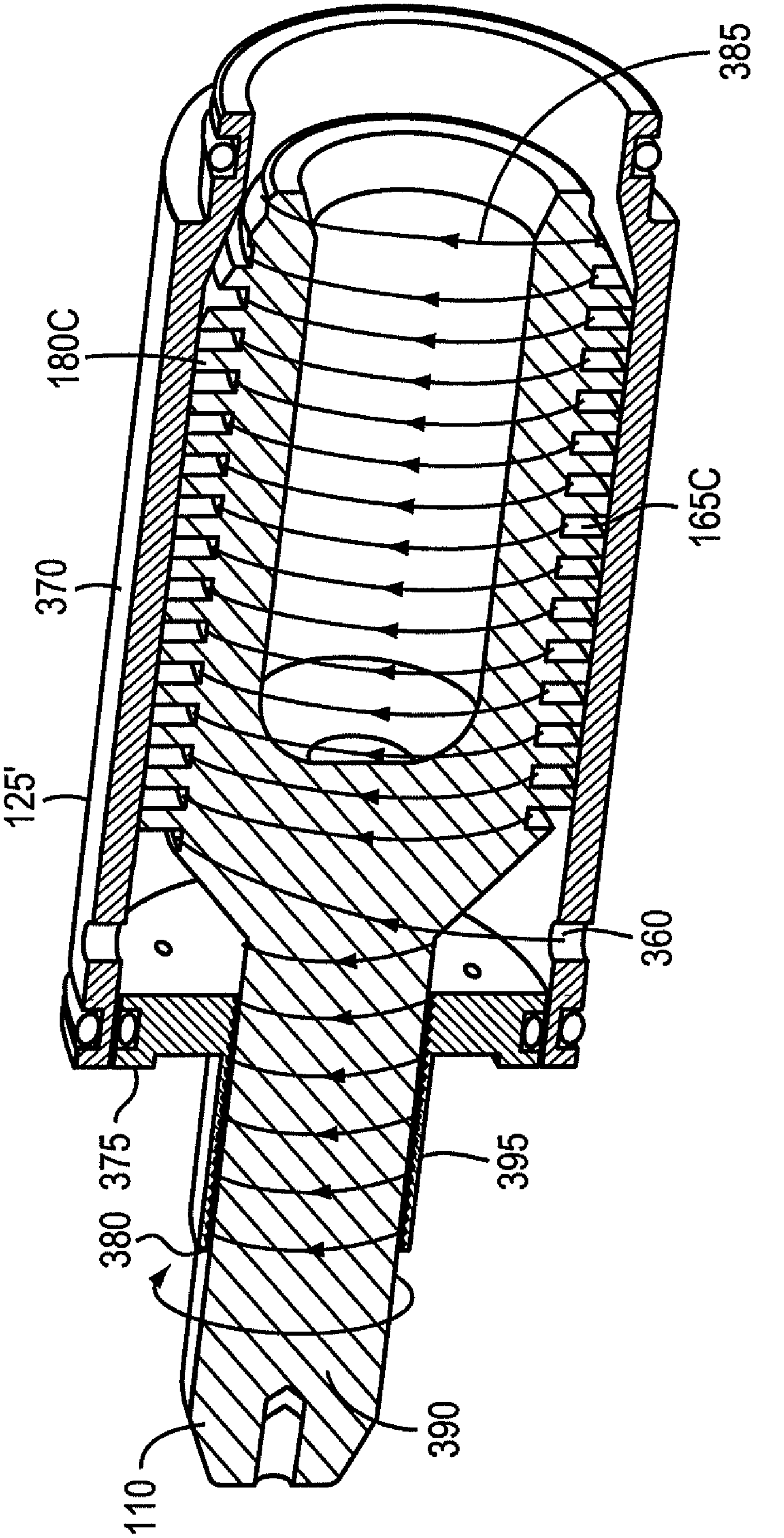
FIG. 10A is a sectional view of a swirl ring and electrode assembly for a plasma arc torch, according to an illustrative embodiment.
Figure 10B:
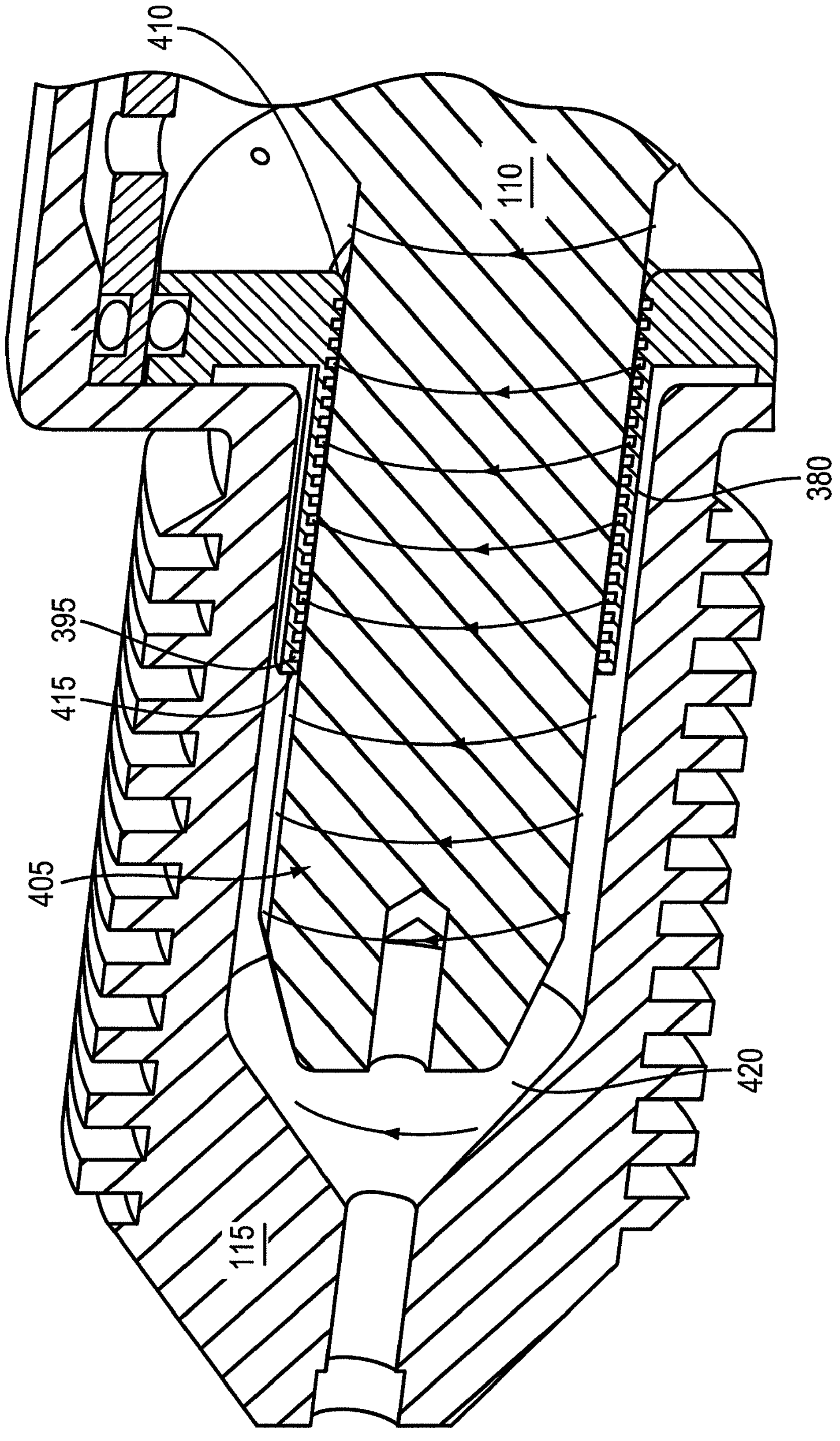
FIG. 10B is an alternative view of the swirl ring and electrode assembly of FIG. 10A.
Figure 10C:
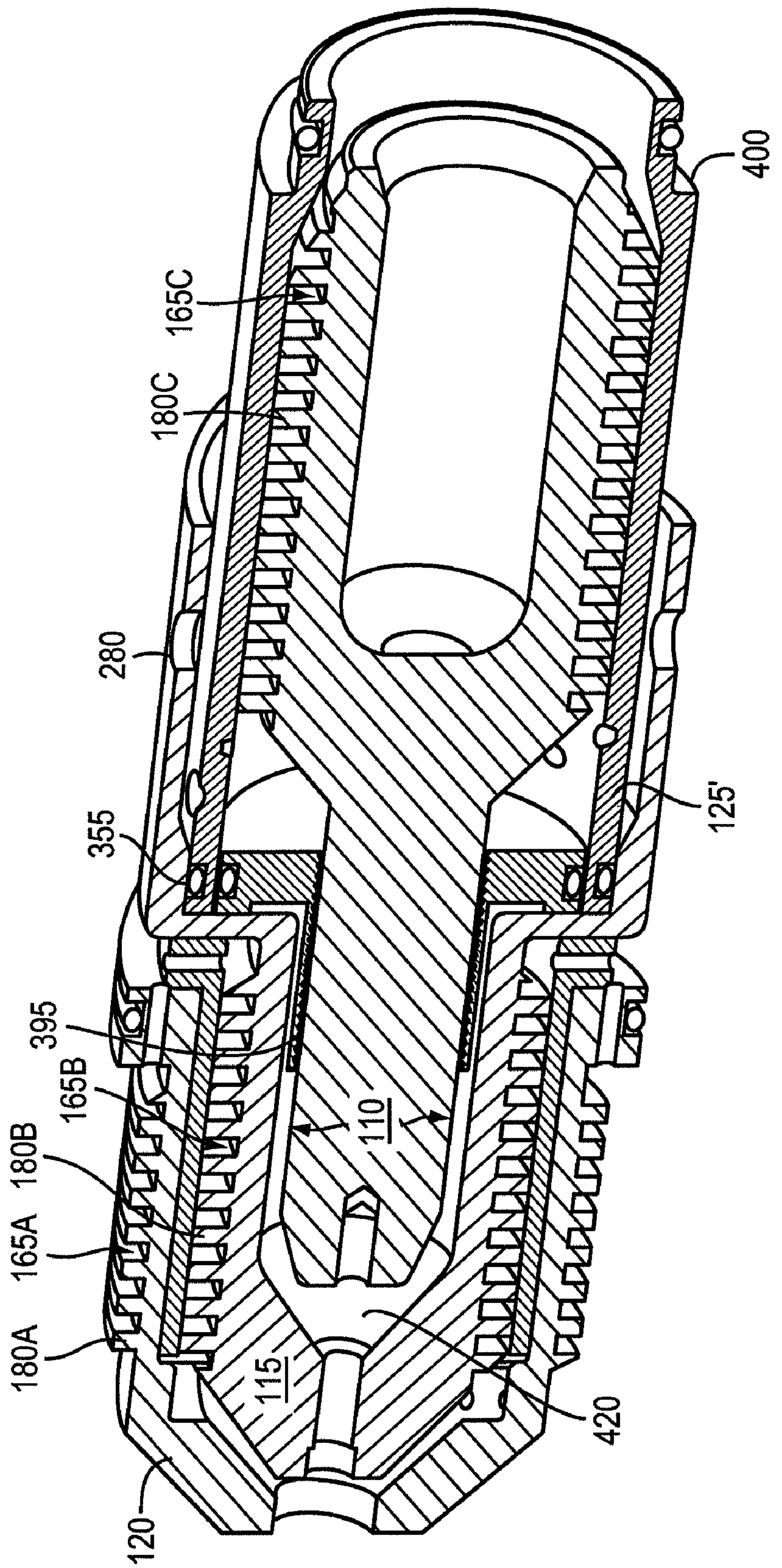
FIG. 10C is a drawing of the swirl ring of FIG. 10A in communication with a nozzle, shield, and electrode of a plasma arc torch, according to an illustrative embodiment.
Figure 10D:
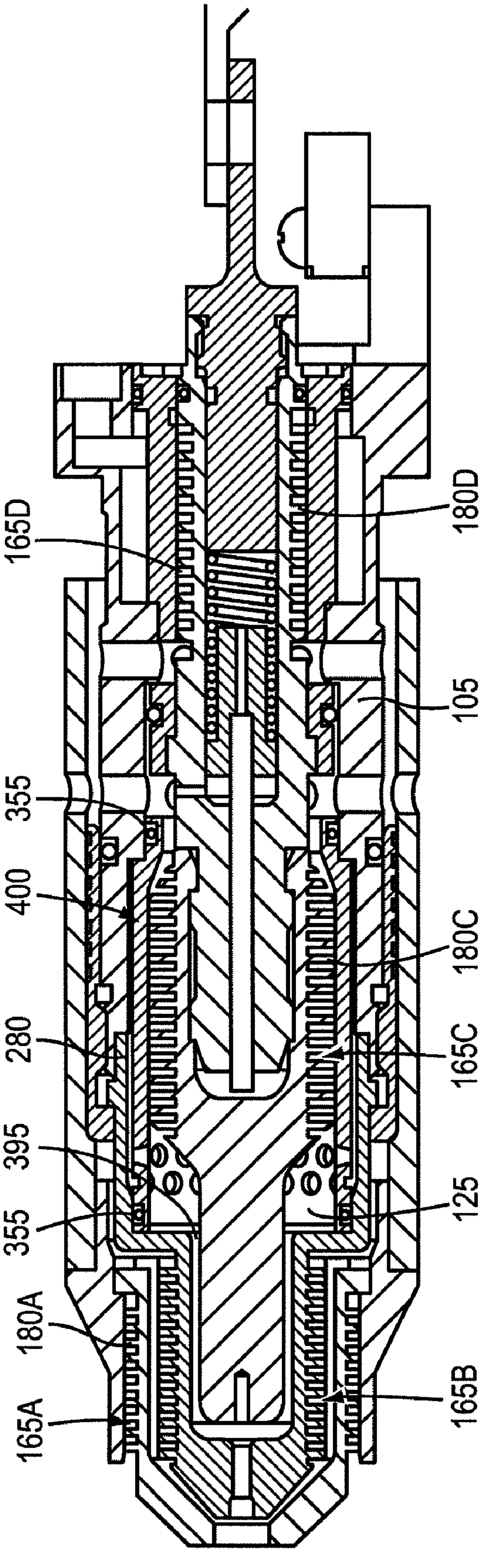
FIG. 10D is an alternative view of the swirl ring of FIG. 10A relative to a plasma arc torch, according to an illustrative embodiment.

FIG. 10A is a sectional view of a swirl ring and electrode assembly for a plasma arc torch, according to an illustrative embodiment. FIG. 10B is an alternative view of the swirl ring and electrode assembly of FIG. 10A. The electrode can be an electrode 110 as shown in FIGS. 6A and 6B. In FIGS. 10C and 10D, the swirl ring 125' is shown in relationship to other torch consumable parts and the torch body. The swirl ring body 370 can be gas sealed so that the plasma gas flow entering ports (e.g., the swirl holes) can split into two flow paths.

In some embodiments, a cooling gas flow from the electrode 385 flows through a cooling gas flow channel 165C disposed relative to the electrode 110. The cooling gas flow channel 165C can be defined by at least one fin 180C and can be a spiral groove. A swirling plasma gas flow 390 can flow through a flow choking annular gap 395 between the electrode 110 and the choke tube portion 380 of the plasma gas flow choke 375 of the swirl ring 125'. In some embodiments, the plasma gas flow choke 375 includes an indented feature (not shown). As shown in FIG. 10D, in some embodiments, the swirl ring 125 does not include a flow choke portion.

In some embodiments, the swirl ring 125' is gas sealed with the nozzle 115 at a distal end of the swirl ring 125' with a sealing assembly 355 (e.g., o-ring) at distal portion 395 of the swirl ring 125'. The swirl ring 125' can be also sealed at a proximal end 400 of the swirl ring 125' with the torch body 105 with a sealing assembly 355 (e.g., an o-ring). The swirl-ring 125' can be free to move in the axial direction, substantially avoiding distortion caused by clamping forces. In some embodiments, the swirl ring 125' includes a choking feature 375, resulting in a pressure drop experienced by the plasma gas flow 390.

In some embodiments, cooling gas flow channels 165A-D (e.g., spiral groove heat exchangers) defined by at least one fin, can be disposed on a shield 120, nozzle 115, electrode 110, the torch body 105, or any combination thereof. In some embodiments, the cooling gas flowing in the cooling gas flow channels 165A-D (e.g., heat exchangers) can vent to atmospheric pressure. To get the desired flow through the cooling gas flow channels 165A-D, an up-stream pressure should be set at the proper higher level to drive the flow. In some embodiments, the up-stream pressure has been limited to a value determined for optimal operation of the plasma arc. For example, typical plasma chamber pressures can range from 40-70 psig. An up-stream pressure of 40-70 psig can lead to a sub-optimal cooling gas flow channel design in the electrode 110, which can lead to a relatively high volumetric flow rate and a low pressure drop across the cooling gas flow channel 165C. To improve the performance of the cooling gas flow channel 165C, a large surface area can be used, which can require a lower flow rate and a higher pressure drop. The present technology solves this problem by changing the relationship between the plasma gas operating pressure and the up-stream pressure of the heat exchangers.

The plasma gas flow 390 can be forced to flow through a restrictive flow choking area or gap 395. This gap or area 395 can be formed between the electrode 110 and an inner surface of the tube portion 380 (e.g., defined by a tube portion diameter 405) of the swirl ring 125'. The tube portion 380 of the swirl ring 125' can include an inlet 410 disposed relative to a proximal portion of the swirl ring and an outlet 415 disposed relative to a distal portion of the swirl ring. In some embodiments, the flow choking area or gap 395 causes a pressure drop from the inlet 410 to the outlet 415 of the tube portion 380 of plasma gas flow choke 375. The outlet 415 can be directly coupled to the plasma chamber 420. By properly sizing the diameter and length of the tube portion 380 of the swirl ring 125', the optimal plasma gas pressure in the plasma chamber 420 can be achieved while at the same time allowing a high pressure for the up-stream pressure of the cooling gas flow channels 165C to be achieved.

By way of example, for an embodiment of a plasma cutting nozzle designed for operation at 200 Amp, a typical plasma gas flow rate would be about 60 scfh and a typical operating pressure in the plasma chamber 420 would be about 60 psig. In some embodiments, for an electrode 110 diameter of 0.268" and a gap of 0.002", an operating pressure drop is about 40 psig, allowing the up-stream pressure to be operated at 100 psig.

Figure 11A:
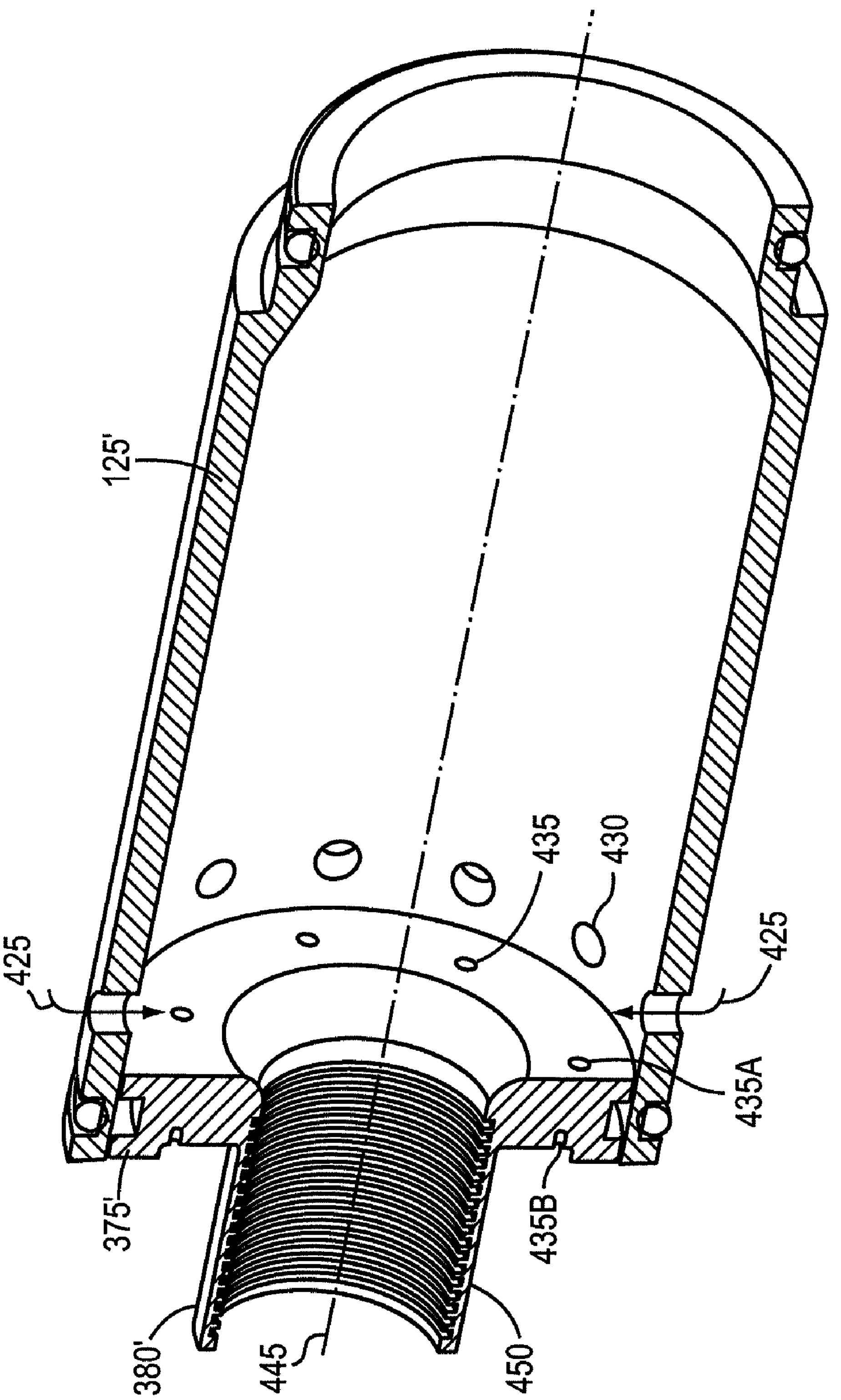
FIG. 11A is a cut away view of a swirl ring for a plasma arc torch, according to another illustrative embodiment.
Figure 11B:
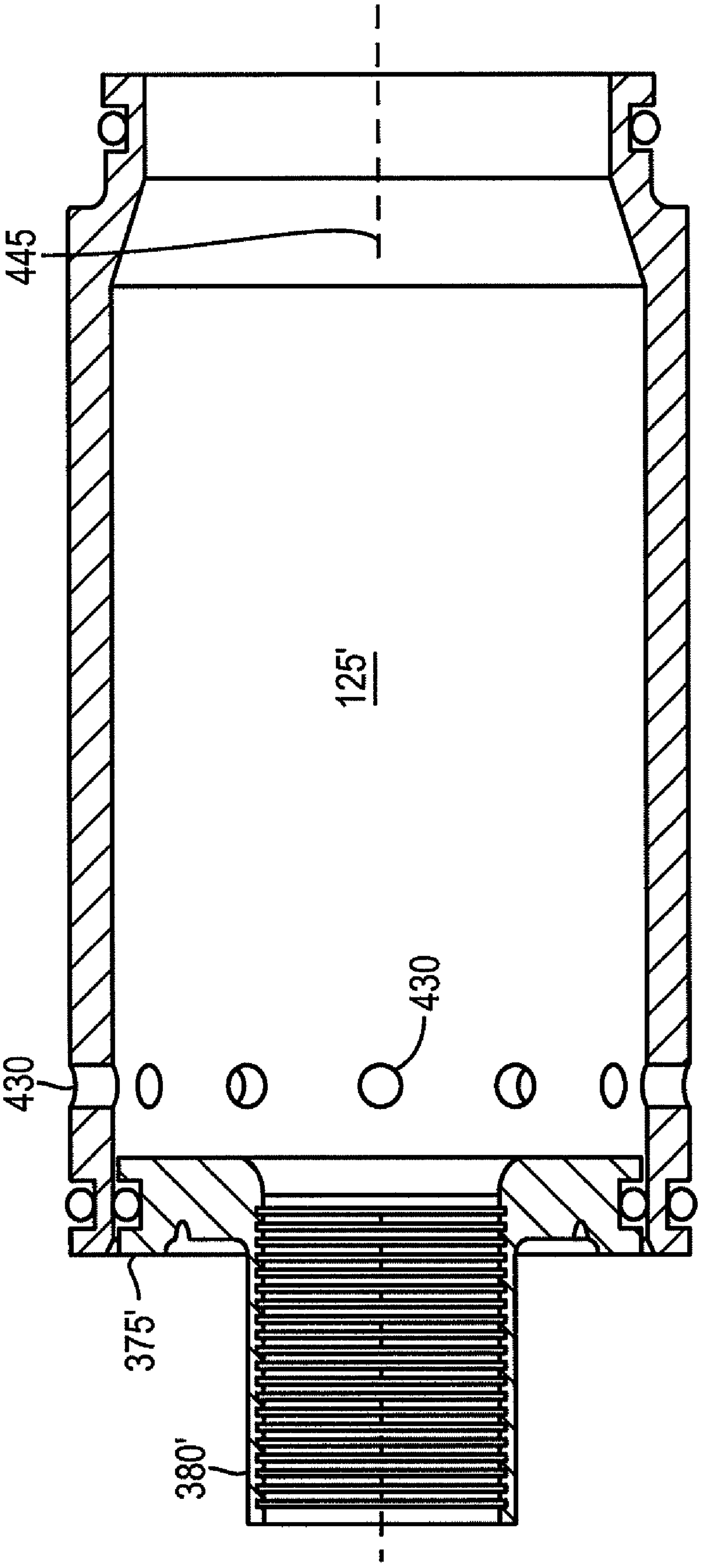
FIG. 11B is a cross-sectional drawing of the swirl ring of FIG. 11A.
Figure 11C:
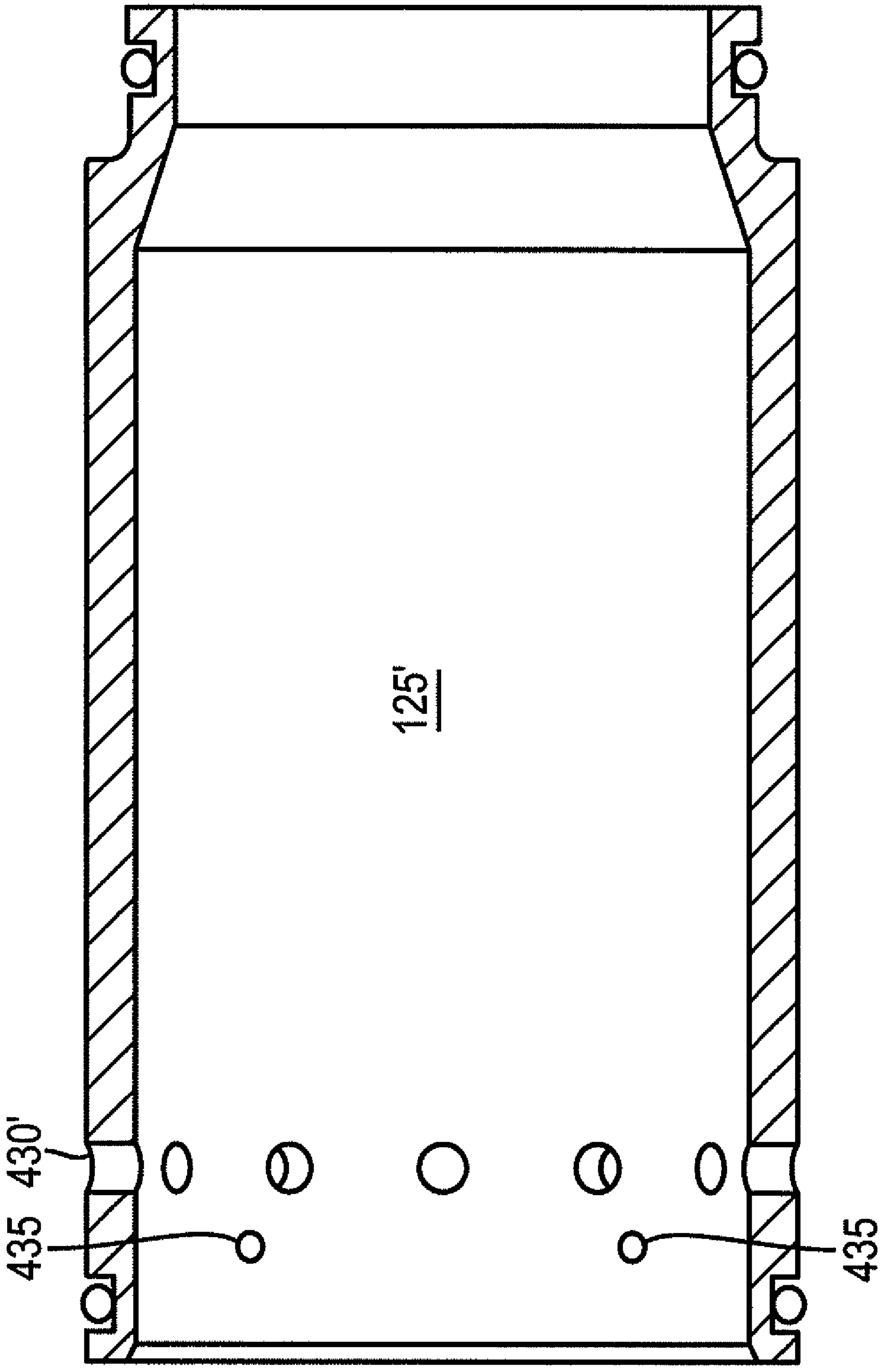
FIG. 11C is a cross-sectional drawing of the swirl ring showing ports and sealing assembly of the swirl ring of FIG. 11A.
Figure 11D:
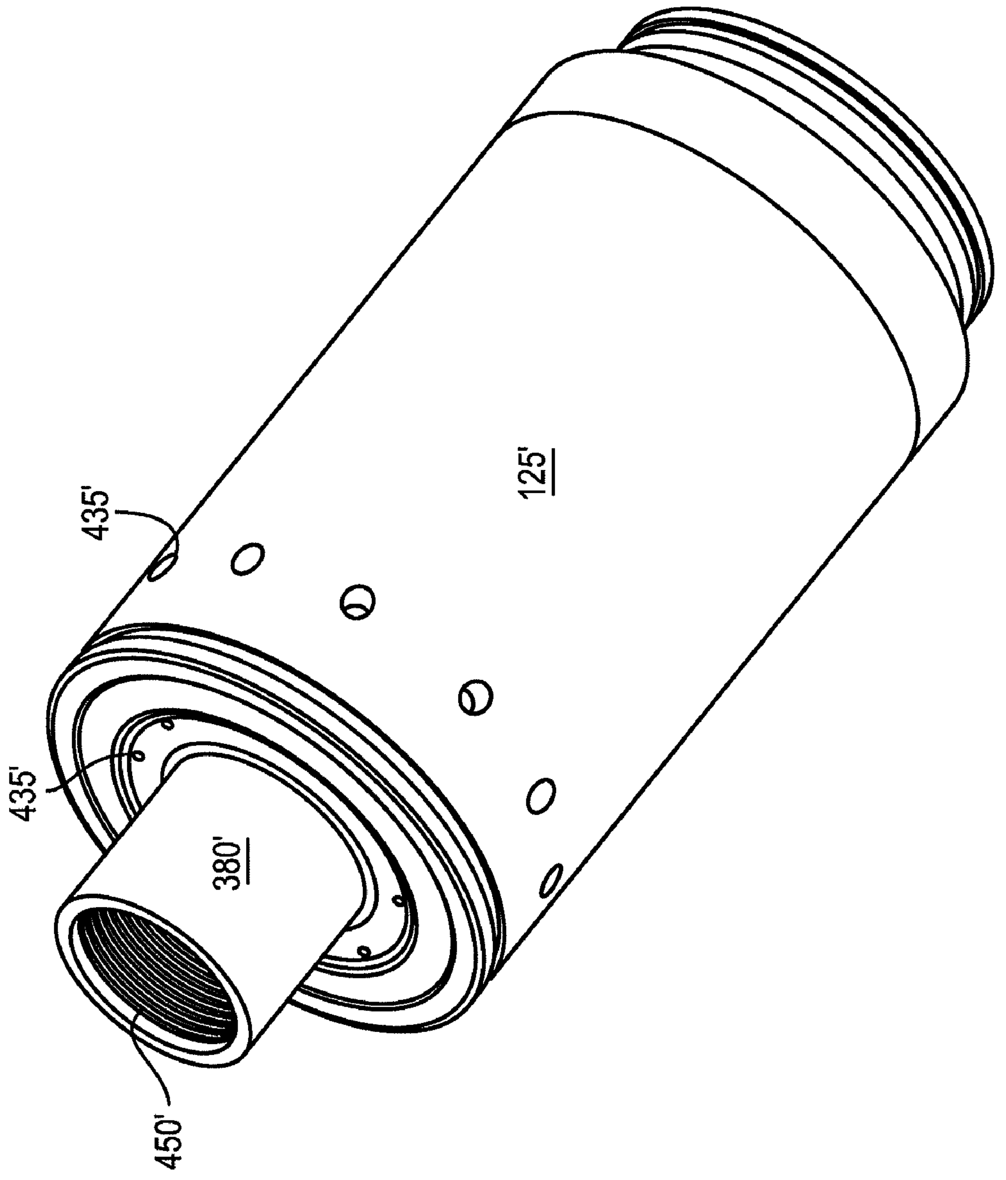
FIG. 11D is an isometric view of the swirl ring of FIG. 11A.
Figure 11E:
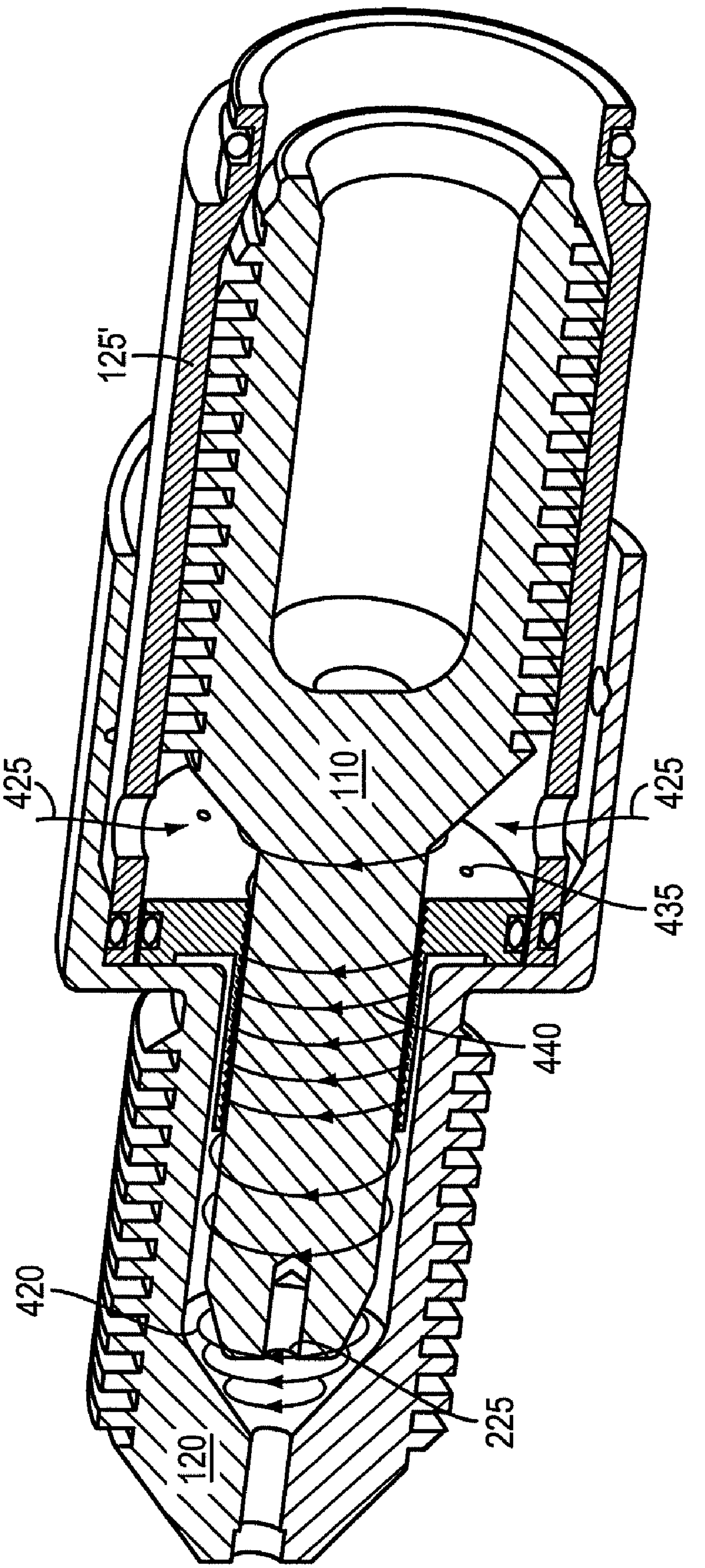
FIG. 11E is a drawing showing a gas flow from the swirl ring of FIGS. 11A-11D.

FIGS. 11A-D are different views of a swirl ring for a plasma arc torch, according to an illustrative embodiment. FIG. 11E is a drawing showing a gas flow from the swirl ring of FIGS. 11A-D. In this embodiment, plasma gas flow 425 enters the swirl ring 125' through a plurality of radial ports 430 (e.g., radial holes) in a high pressure side of the swirl ring 125'. In some embodiments, the number of ports 430 and the diameter of the ports 430 are large so that the pressure-drop across the ports 430 is small. In some embodiments, the ports 430 are not off-set and does not resulting in a swirling flow.

In some embodiments, a swirl ring 125' for a moving-electrode (e.g., blow back) plasma torch includes a pressure dropping restriction area. The restriction area can produce a flow of gas at a flow rate and pressure for properly optimizing plasma operation while simultaneously producing a flow of gas at the proper (e.g., higher) flow rate and pressure drop required to effectively accomplish the heat exchange function. The flow restriction portion also can produce a swirling component in the plasma gas flow. The swirl ring 125' can include gas seals that allow the swirl ring 125' to ‘float’ axially, thereby substantially eliminating distortion caused by clamping forces.

In some embodiments, the swirl ring 125' includes flow choking ports 435 (e.g., flow choking holes). The plasma gas flow 440 can be forced to flow through the restrictive flow choking cross-sectional area of the ports 435. The flow choking ports 435 cause the gas pressure to drop from inlets 435A to outlets 435B. In some embodiments, the hole outlets 435B are directly exposed to and discharge into the plasma chamber 420. By properly sizing the diameter and length of the restrictive flow choking holes 435, optimal plasma gas pressure in the plasma chamber 420 can be achieved while at the same time achieving a high pressure for the up-stream pressure of the cooling gas flow channels 165C (e.g., spiral groove heat exchangers). The ports 435' can be sized and have a diameter and off-set position so as to produce swirling flow of a magnitude which produces a plasma jet which is extended by the ‘co-axial’ flow of the nozzle cooling flow. Swirling can be imparted to the plasma gas by canting the ports 430 at an angle to the common center axis of the consumable parts 445. The proper amount of swirl can be obtained by adjusting the angle of the canted ports.

To restrict the plasma gas flow 440 to the ports 435 and retard the flow through the annular gap between the electrode 110 and an inner surface of the tube portion of the swirl ring 125', a series of small grooves 450 can be formed on the interior of the tube portion 380' of the plasma gas flow choke 375' of the swirl ring 125. Although there is a gap between the electrode 110 and an inner surface of the tube portion 380', the grooves 450 cause such a large pressure drop that the flow through the gap is negligibly small. Flow seals of this type are sometimes referred to as ‘labyrinth’ seals. The swirl ring body and the plasma gas flow choke element 375' can be separate pieces or can be one single part, e.g., an integral piece.

In some embodiments, the same gas source supplies the plasma gas and the gas used for cooling and electrode actuation. The swirl ring 125' can separate the functionality of the required high pressure of the electrode 110' actuation and the high pressure of the torch cooling function from the lower plasma gas pressure in the ‘plasma chamber’ 420. The plasma chamber 420 is the zone immediately between the electron emitting element on the end of the electrode 110 and the nozzle orifice 225, and can be defined by the electrode 110 and the nozzle 115. The pressure in this zone can be about 40-70 psig for proper functioning of the plasma arc during the cutting process. With the addition of a pressure dropping seal between this plasma chamber 420 and the high pressure zone in the swirl ring 125, the pressure in the plasma chamber 420' can be about 40-70 psig, while the pressure in the high pressure zone of the swirl ring 125' can be much higher, typically 70-120 psig. The high pressure in the swirl ring 125' flow inlet zone can allow for rapid reliable actuation, or movement, of the electrode 110 and can allow for higher pressure operation of the cooling gas flow channels 165A-D (e.g., spiral groove heat exchangers) that can be disposed throughout the torch (thereby enhancing cooling performance). The actuation and plasma gas streams can be separated by the pressure dropping function described above.

Figure 12A:
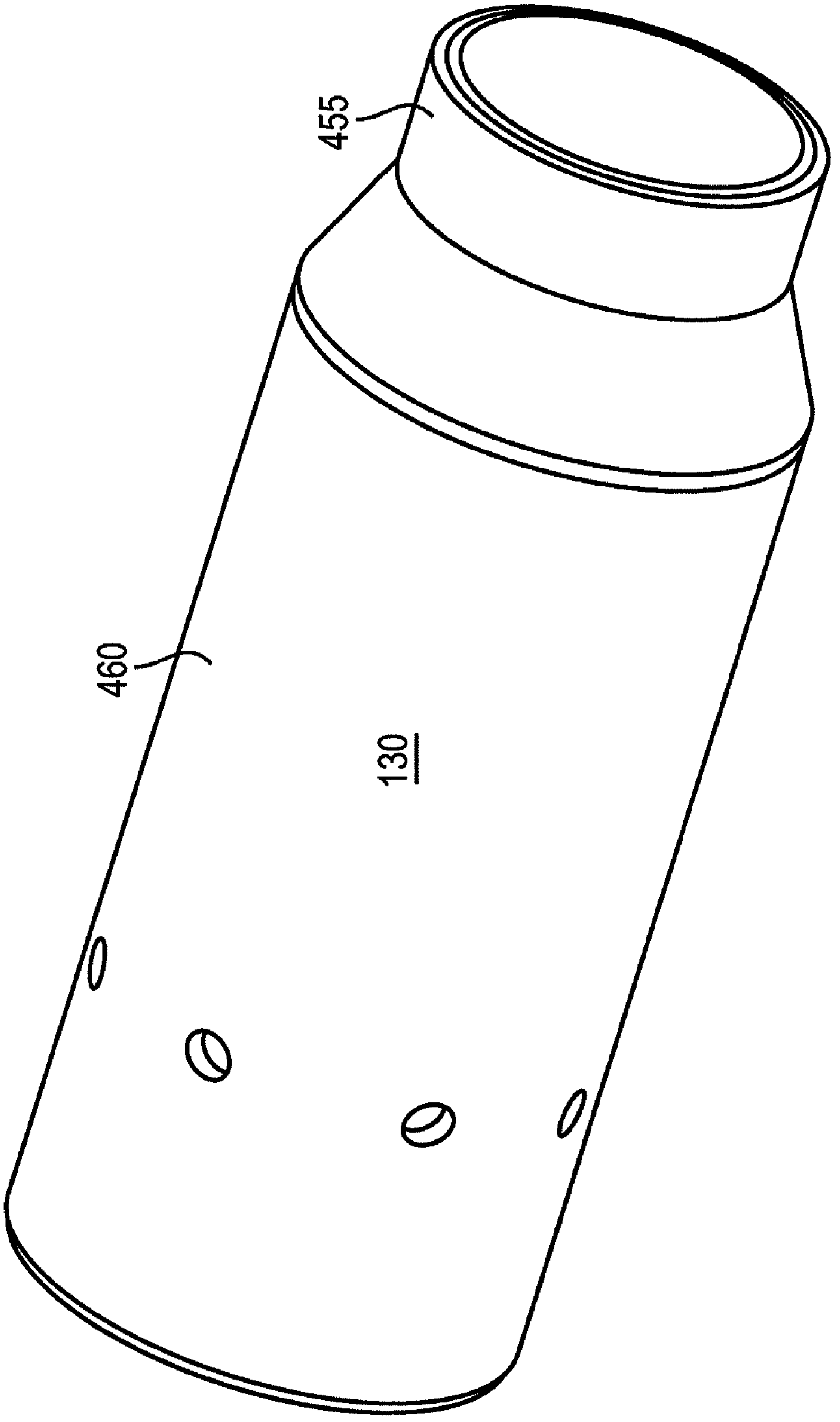
FIG. 12A is a three-dimensional drawing of a retainer cap for a plasma arc torch, according to an illustrative embodiment.
Figure 12B:
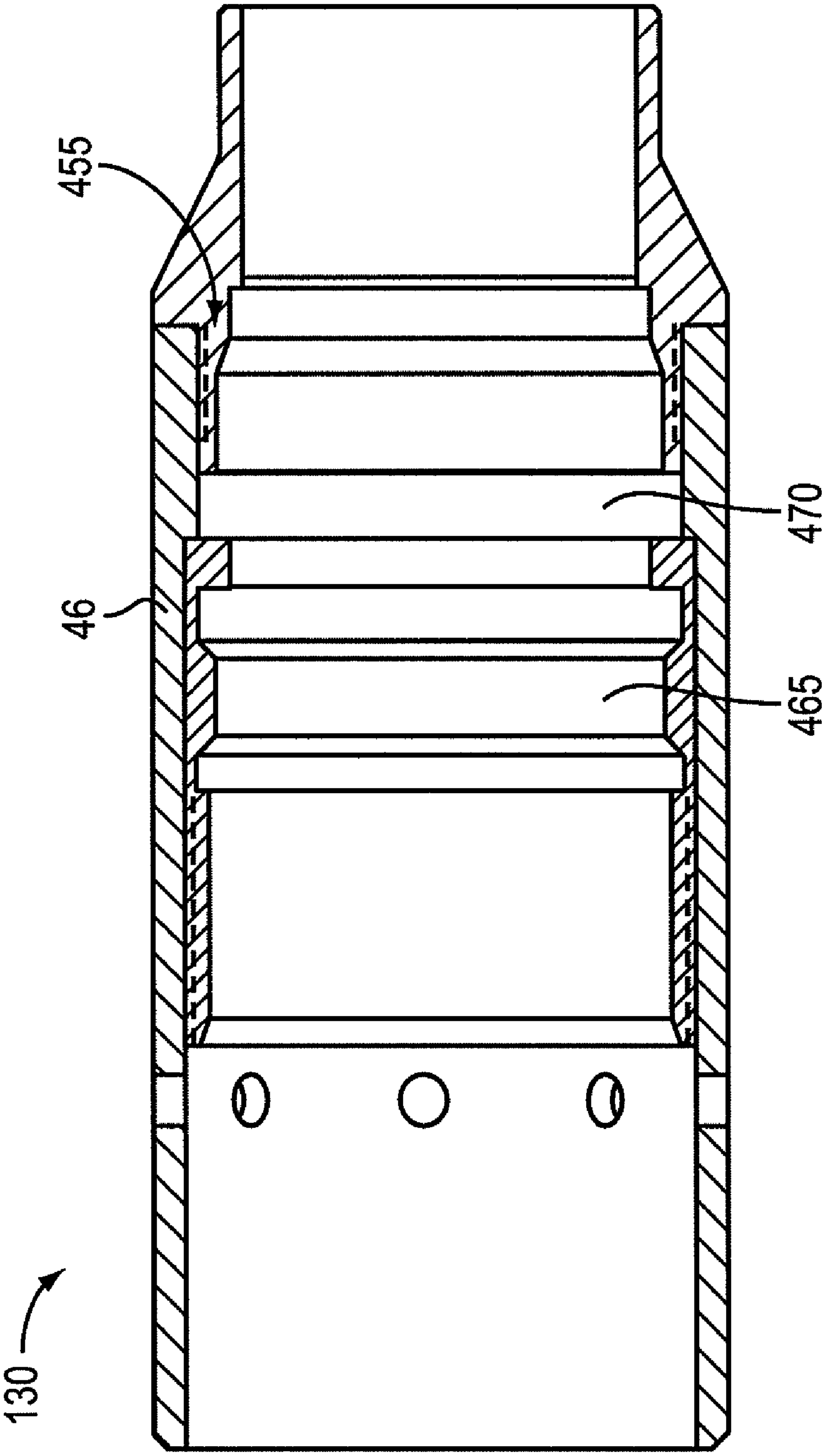
FIG. 12B is a cross-sectional view of the retainer cap of FIG. 12A.

FIG. 12A is a three-dimensional drawing of a retainer cap 130 for a plasma arc torch, according to an illustrative embodiment. FIG. 12B is a cross-sectional view of the retainer cap 130 of FIG. 12A. The retaining cap 130 can include a distal portion 455 (e.g., front electrically isolated portion), a sleeve portion 460 and a threaded portion 465.

Sleeve portion 460 can be made of an electrically insulating material which can withstand relatively high temperatures. In some embodiments, the sleeve portion 460 comprises of a fiber wound composite material, such as those that are commercially available from the Coastal Composites Corp.

The distal portion 455 can be electrically isolated and can serve as an electrically isolated nozzle contact portion. In some embodiments, the electrically isolated portion and the threaded portion 465 is separated by a gap 470. The nozzle contact portion and the threaded portion 465 can be held and aligned by an electrically insulating sleeve portion 460. In some embodiments, the electrically isolated portion 455 and the threaded portion 465 can be pressed into the sleeve portion 460. The electrically isolated portion 455 clamps on to the nozzle 115 and shield 120 and holds the entire consumable group into the torch body 105.

Figure 13A:
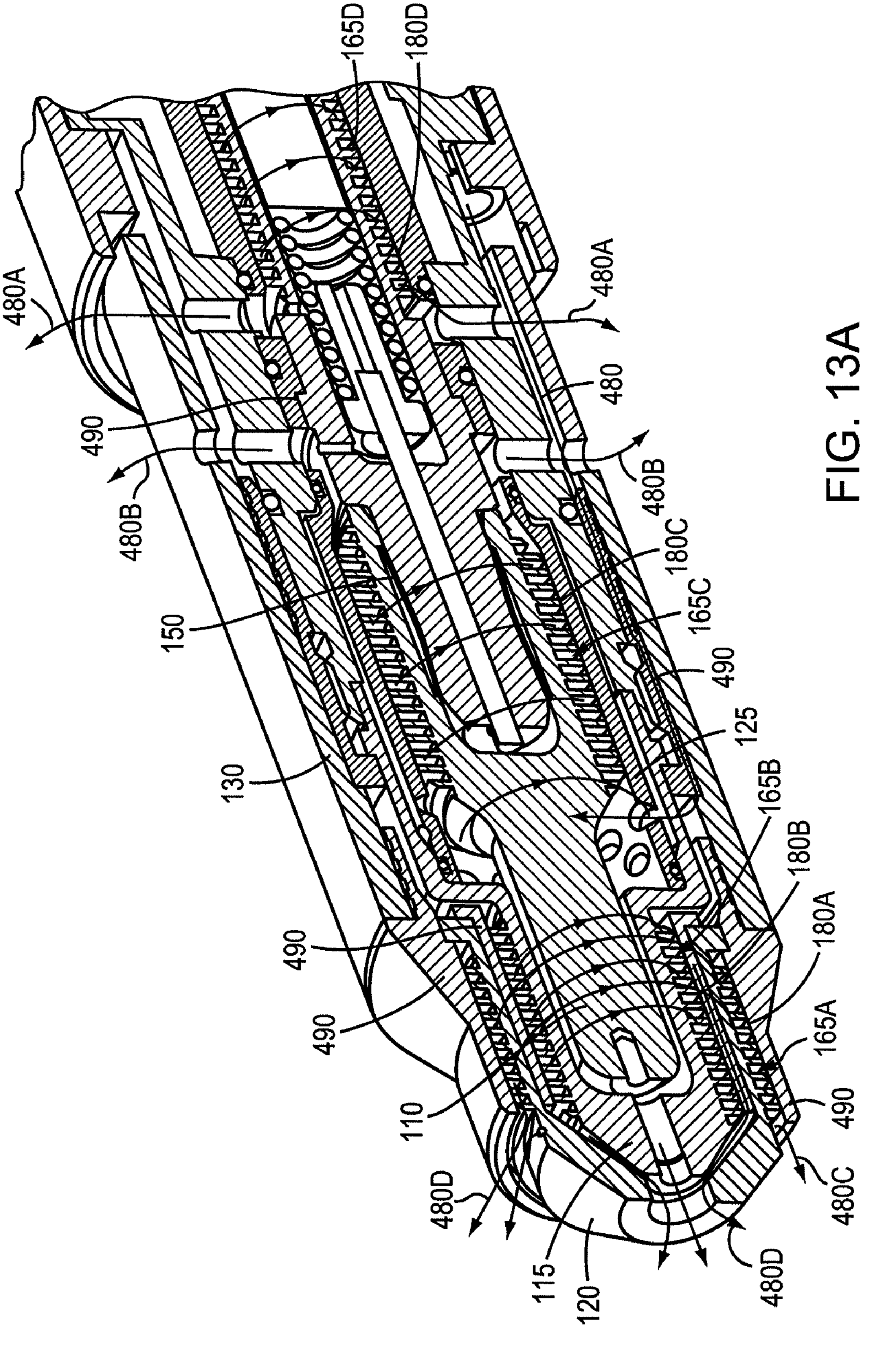
FIG. 13A is a schematic of cooling gas and actuation gas flowing through a plasma arc torch, according to an illustrative embodiment.

FIG. 13A is a schematic of a cooling gas and actuation gas flowing through a plasma arc torch, according to an illustrative embodiment. In some embodiments, the torch body 105 is cooled internally by the addition of a cooling gas flow channel 165D defined by at least one fin 180D, located on the internal body part of the torch. Additional cooling gas paths in torch 100 can supply cooling gas to other cooling gas flow channels 165A-C (e.g., spiral groove heat exchangers) located in other areas of the torch 100. Cooling gas flow channels 165A-D can be disposed relative to the nozzle 115, shield 120, electrode 110, or any combination thereof. In this embodiment, one branch of the cooling path delivers a cooling gas to the torch body cooling gas flow channel 165D (e.g., spiral groove heat exchanger) of torch body 105. Another cooling gas path can deliver cooling gas to the shield cooling gas flow channel 165A (e.g., spiral groove heat exchanger) of shield 120. Another cooling gas path can deliver cooling gas to the nozzle cooling gas flow channel 165B (e.g., spiral groove heat exchanger) of nozzle 115. The plasma arc torch 100 can also include a main body 105 and insulators 490 disposed relative to the torch body; nozzle, shield insulator, retaining cap including clamp part, thread part, insulator part, power lead, and pilot lead.

A cooling gas flow can enter the torch 100 via a cooling gas tube and splits into two flow paths after it enters the torch 100. A portion of the cooling gas can flow to the torch body 105 and a second portion flows forward to the nozzle 115 and other consumables. The flow can split upon reaching the nozzle 115 and a first portion can flow to the plasma chamber 420 and the electrode 110 through the swirl ring 125 and a second portion flows into the nozzle 115 and shield 120 assembly. By splitting the flow into a plurality of parallel cooling paths, the incoming cooling gas enters the cooling gas flow channels 165A-D disposed on any of the consumables at a cooler temperature (ready to pickup heat). It can be desirable to operate the plasma torch 100 so that the cooling gas flowing through cooling gas flow channels 165A-D disposed through out the torch 100 is sufficient to transfer the maximum amount of heat and to limit the torch 100 operating temperatures to a safe range.

In some embodiments, the plasma gas is separated from the cooling gas and actuation gas 475 by bringing them to the torch via two separate gas paths. In some embodiments, a plasma arc torch includes a plasma gas supply and a separate cooling and actuation gas supply. In some embodiments, one gas path supplies the plasma gas to the plasma chamber at the flow rate and pressure required for the cutting process. The pressure in the plasma gas chamber can be operated between 40-70 psig. In some embodiments, another gas path can supply the cooling gas to the cooling gas flow channels 165A-D (e.g., heat exchangers) and the actuation gas for the contact start (e.g., blow back) electrode movement. By way of example, the cooling and actuation gas path 480 supplies the cooling and actuation gas 475 to several areas of torch 100. In one flow path, the cooling and actuation gas 475 can flow into the high pressure zone 485 of the swirl ring 125. The pressure and flow rate of this gas can be sufficient to cool the electrode 110 and to move or actuate the electrode 110 into its operating position (the electrode is shown in its operating position).

Cooling of the electrode 110 can be accomplished by allowing cooling gas to flow through the spiral cooling groove 165C and out of the torch through holes 480B. The pressure required to actuate the electrode 110 and move it into its operating position is determined by the retarding force of the return spring 160, working against the electrode through plunger 155 and the drag force (longitudinal frictional force) caused by the circumscribing radial spring element 150 (e.g., LOUVERTAC electrical contact). Typical pressures for proper actuation and cooling can be in a range of between 70-120 psig.

The plasma gas can be separated from the cooling and/or actuation gas by a gas separating member. The plasma chamber can be sealed from the cooling and actuation gas by the sealing assembly 355 of swirl ring 125. In some embodiments, the sealing assembly 355 is a 'labyrinth seal', an o-ring seal, or any combination thereof. In some embodiments, sealing assembly 355 includes a labyrinth sealing section that includes a number of grooves formed on an interior surface of a sealing part. There can be a gap between the electrode 110 and grooves can cause a pressure drop sufficiently large while reducing the gas flow allowed through the gap to a negligibly small amount. Flow seals of this type are sometimes referred to as 'labyrinth' seals.

Figure 13B:
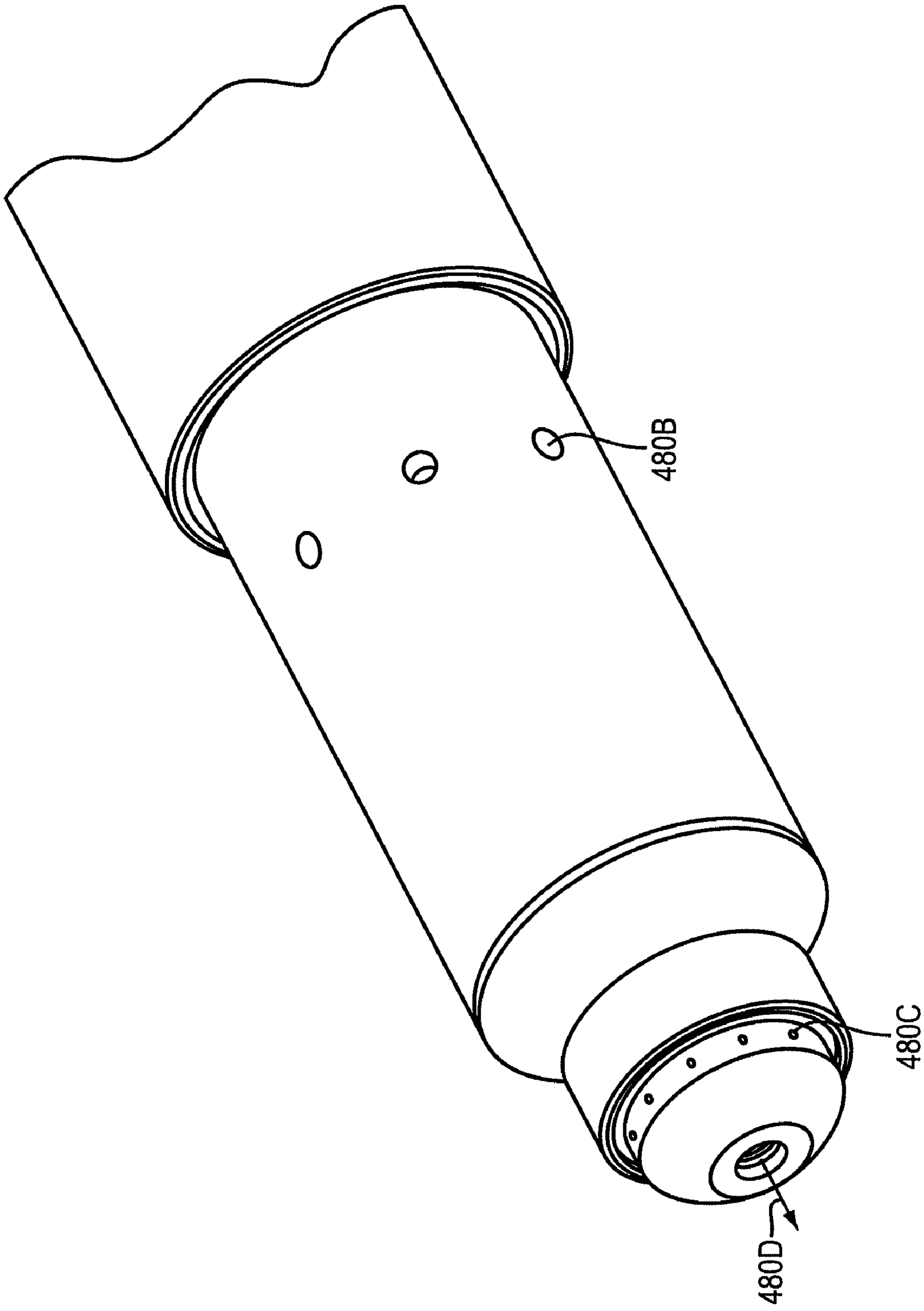
FIG. 13B is an isometric view of the plasma arc torch of FIG. 13A, according to an illustrative embodiment.

In the embodiment shown in FIG. 13A, cooling and actuation gas flow 475 enters the flow path 480 at inlet (not shown). FIG. 13B is an isometric view of the plasma arc torch of FIG. 13A showing the inlet and outlet holes for the gas flow. Cooling of the electrode 110 can be accomplished by allowing cooling gas flow through a cooling gas flow channel 160C (e.g., spiral cooling groove) and out of the torch through holes 480B. Cooling of the torch body 105 can be accomplished by allowing cooling gas flow through the cooling gas flow channel 165D (e.g., spiral cooling groove) and out of the torch through holes 480A. Cooling of the shield 120 can be accomplished by allowing cooling gas flow through the cooling gas flow channel 165A (e.g., spiral cooling groove) and out of the torch through gap 480C at the end of the cooling gas flow channel 165A between the shield 120 and clamp part of the retaining cap 130. Cooling of the nozzle 115 can be accomplished by allowing cooling gas flow through the cooling gas flow channel 165B (e.g., spiral cooling groove) and out of the torch through the annular gap between the nozzle 115 and shield 120 at 480D.

Figure 13C:
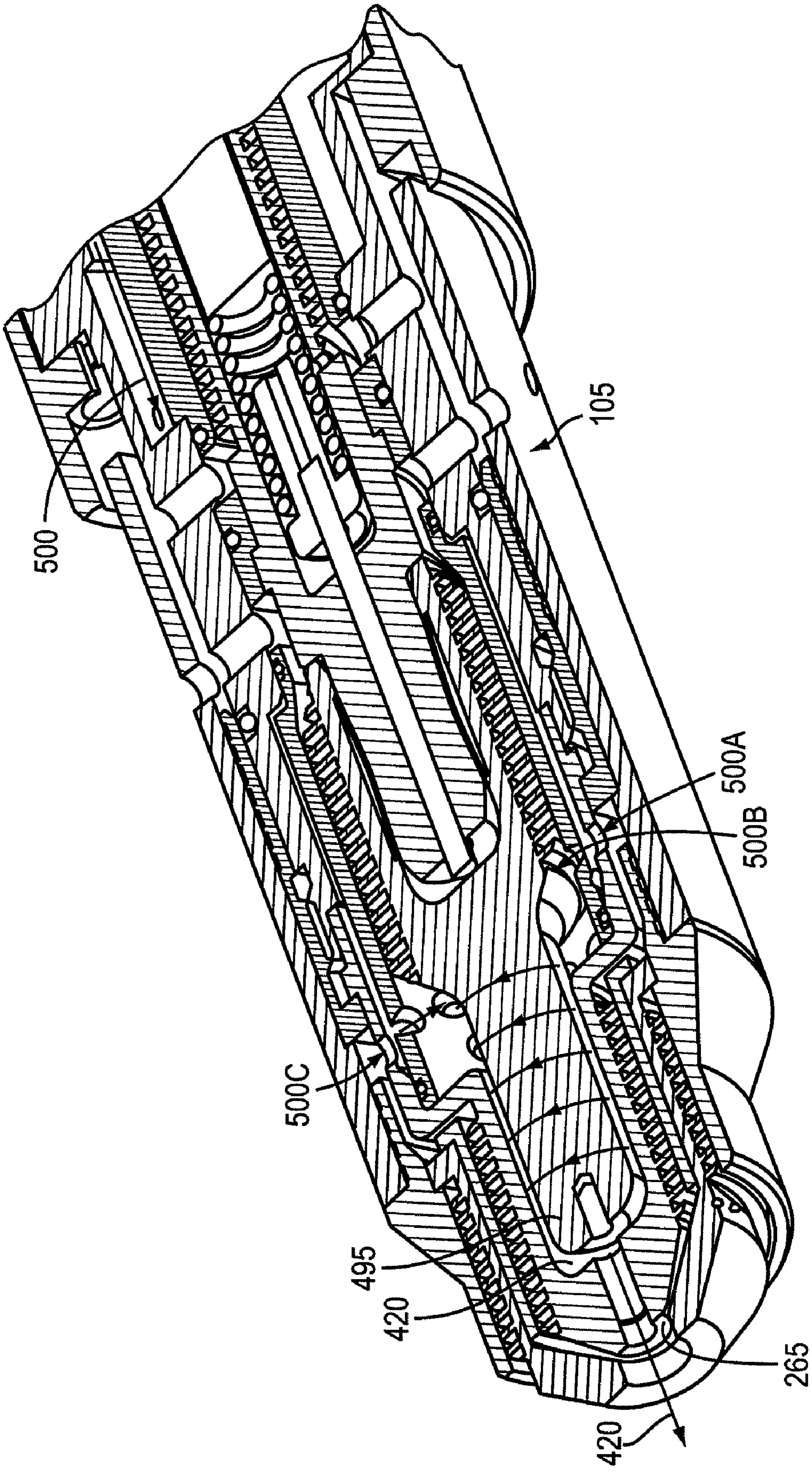
FIG. 13C is a schematic of plasma gas flowing through a plasma arc torch, according to an illustrative embodiment.

FIG. 13C is a schematic of a plasma gas flowing through a plasma arc torch, according to an illustrative embodiment. Plasma gas 495 can enter the flow path 500 through inlet (not shown) and flow to plenum 500A in the main body 105, which can connect to plenum 500B in the nozzle 115 and then flow through swirl ports 500C in the swirl ring 125 and on to the plasma gas chamber 420. During operation of the torch, the pressure in the plasma gas chamber 420 can be kept at approximately 40-70 psig. In some embodiments, swirl ports 500C are off-set from the center-line of the torch to impart a swirling component to the plasma gas. The amount of swirl can be determined based on the requirements of the particular cutting process. The plasma gas exits the plasma gas chamber through the nozzle orifice 265.

Moreover, the torch design described herein and shown schematically in FIG. 13A-C, can use the other features and concepts described above, including the use of a circumscribing radial spring element 150 (e.g., a moving LOUVERTAC electrical contact), a cooling gas flow channel 165A-D disposed relative to a nozzle 115, torch body 105, electrode 110, and/or shield 120. The torch design can also include the use of an electrically isolated front-end retaining cap 130 and swirl flow retarding vent ports 315 disposed relative to the shield.

Figure 14:
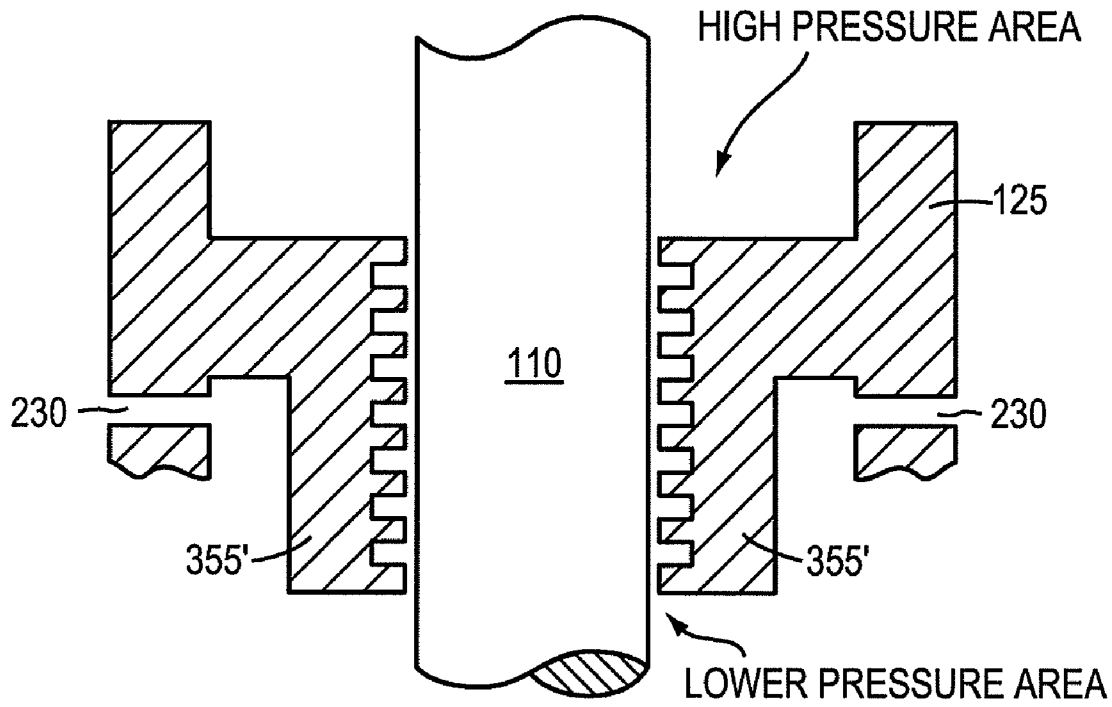
FIG. 14 is a schematic of a sealing assembly for a swirl ring, according to an illustrative embodiment.

FIG. 14 is a schematic of a sealing assembly 355' for a swirl ring 125, according to an illustrative embodiment. In some embodiments, the swirl ring includes a seal assembly 355' that acts as a gas sealing part of the swirl ring 125. The seal assembly 355' can be a 'labyrinth seal'. In this embodiment, the electrode 110 does not contact the sealing assembly 355' (e.g., sealing part) of swirl ring 125. The seal can be caused by the gas expansions in each of the grooves 450'. Increasing the number of grooves 450' results in a larger pressure drop and reduction in gas flow.

Figure 15:
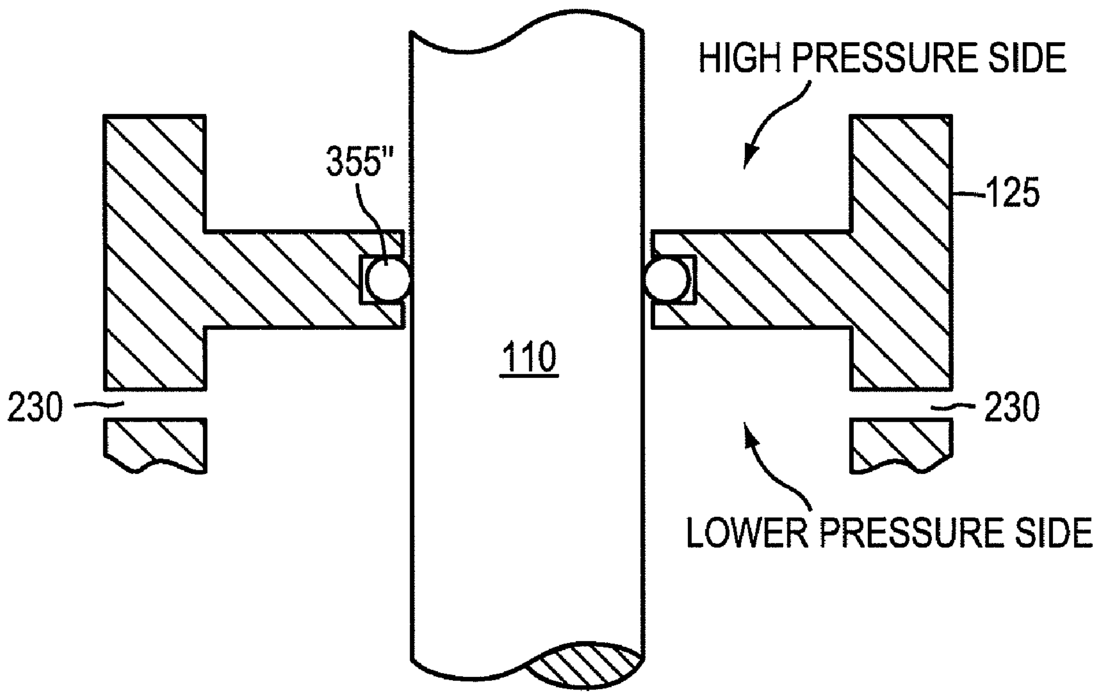
FIG. 15 is a schematic of a sealing assembly for a swirl ring, according to another illustrative embodiment.

FIG. 15 is a schematic of a sealing assembly 355" for a swirl ring 125, according to another illustrative embodiment. In some embodiments, the swirl ring 125 includes a seal assembly 355" that acts as a gas sealing part of the swirl ring 125. The seal assembly 355" can be an o-ring. In this embodiment, an o-ring seals the high pressure side from the lower pressure side. Because the o-ring is in contact with the electrode 110, there is an additional drag force applied to the electrode 110 when it moves. For proper operation, compensation for this drag force must be accounted for when the torch is designed.

While the invention has been particularly shown and described with reference to specific illustrative embodiments, it should be understood that various changes in form and detail may be made without departing from the spirit and scope of the invention as defined by the appended claims.

What is claimed is:

1. A nozzle for a gas-cooled plasma arc cutting torch, the nozzle comprising:
- a generally hollow, conductive body configured to receive an electrode;
- a plasma exit orifice disposed at an end of the body; and
- a cooling gas flow channel defined by one or more fins disposed about an exterior surface of the body and configured to direct a majority of a cooling gas flow between opposing surfaces of the one or more fins of the cooling gas flow channel thereby allowing a lesser amount of the cooling gas to flow over the fins, the body providing a thermally conductive path that transfers heat from the body to the cooling gas flow channel during an operation of the torch, the one or more fins having a height and a width, the height of the opposing surfaces of the one or more fins being greater than a width of the channel between the opposing surfaces.

2. The nozzle of claim 1 wherein the body of the nozzle comprises a flange that includes at least one port, the port configured to pass at least a portion of a cooling gas flow between the flange and the cooling gas flow channel during operation of the torch.

3. The nozzle of claim 1 wherein the cooling gas flow channel comprises a spiral groove disposed on an external surface of the body of the nozzle.

4. The nozzle of claim 1 wherein the cooling gas flow channel is supplied by more than one gas source.

5. The nozzle of claim 1 wherein the cooling gas flow channel comprises the width, a height and a length dimensioned to establish sufficient heat transfer from the nozzle to a cooling gas flow channel during operation of the torch to prevent premature failure of the nozzle.

6. The nozzle of claim 1 wherein the body is substantially cylindrical.

7. A method for extending the life of a gas-cooled plasma arc cutting torch comprising:
- providing a torch body that includes a plasma gas flow path for directing a plasma gas through a swirl ring to a plasma chamber in which a plasma arc is formed;
- providing the nozzle of claim 1 mounted relative to an electrode at a distal end of the torch body to define the plasma chamber;
- flowing a secondary gas through an external gas channel of the nozzle to cool the nozzle such that the secondary gas flows along the channel; and
- operating the plasma arc cutting torch at an amperage level of at least about 100 Amps.

8. The nozzle of claim 1 wherein the height of each fin is greater than half of the width.

9. A method for cooling a nozzle during an operation of a gas-cooled plasma arc torch, comprising:
- providing the nozzle of claim 1 having a cooling gas flow channel defined by one or more fins disposed about an exterior surface of a nozzle body and configured to direct a majority of a cooling gas flow between opposing surfaces of the one or more fins of the cooling gas flow channel;
- flowing a cooling gas about the exterior surface of the nozzle body, the one or more fins directing a majority of the cooling gas through the gas flow channel; and
- transferring, via the cooling gas flow channel, heat from the nozzle body to the cooling gas flow during the operation of the plasma arc torch.

10. A shield for a gas-cooled plasma arc cutting torch, the shield comprising:
- a generally hollow, conductive body configured to protect a nozzle;
- a cooling gas exit orifice disposed at an end of the body; and
- a cooling gas flow channel defined by one or more fins disposed about an exterior surface of the body and configured to direct a majority of a cooling gas flow between opposing surface of the one or more fins of the cooling gas flow channel thereby allowing a lesser amount of the cooling gas to flow over the fins, the body providing a thermally conductive path that transfers heat from the body to the cooling gas flow channel during an operation of the torch, the one or more fins having a height and a width, the height of the opposing surfaces of the one or more fins being greater than a width of the channel between the opposing surfaces.

11. The shield of claim 10 wherein a height of the shield is at least half of the diameter of the body.

12. The shield of claim 10 wherein the cooling gas flow channel comprises a spiral groove disposed on an external surface of the body.

13. The shield of claim 10 further comprising a flange that includes at least one port, the port configured to pass at least a portion of a cooling gas flow passing between the flange and the cooling gas flow channel during operation of the torch.

14. The shield of claim 10 wherein the cooling gas flow channel can be supplied by more than one gas source.

15. The shield of claim 10 wherein the cooling gas flow channel comprises the width, a height, and a length dimensioned to establish sufficient heat transfer from the shield to a cooling gas flow channel during operation of the torch.

16. The shield of claim 10 further comprising:

a central longitudinal axis;

an interior surface of the shield defining in part a shield gas flow passage; and a bleed port off-set from a central longitudinal axis of the shield that creates an exit flow counter to a swirling motion of the shield gas flow, thereby dampening the swirling motion of the shield gas flow exiting the exit orifice of the shield.

17. A method for extending the life of a gas-cooled plasma arc cutting torch comprising:

providing a torch body that includes a plasma gas flow path for directing a plasma gas to a plasma chamber in which a plasma arc is formed;

providing a nozzle mounted relative to an electrode at a distal end of the torch body to define the plasma chamber;

providing the shield of claim 10 in a spaced relationship to a nozzle at a distal end of the torch body;

flowing a secondary gas through the external gas channel of the shield to cool the shield such that the secondary gas flows along the channel; and operating the plasma arc cutting torch at an amperage level of at least about 100 Amps.

18. The shield of claim 10 wherein the height of each fin is greater than half of the width.

19. A method for cooling a shield during an operation of a gas-cooled plasma arc torch, comprising:

providing the shield of claim 10 having a cooling gas flow channel defined by one or more fins disposed about an exterior surface of the body and configured to direct a majority of a cooling gas flow between opposing surfaces of the one or more fins of the cooling gas flow channel;

flowing a cooling gas about the exterior surface of the shield body, the one or more fins directing a majority of the cooling gas through the gas flow channel; and transferring, via the cooling gas flow channel, heat from the shield body to the cooling gas flow during the operation of the torch.

20. An electrode for a gas-cooled plasma arc cutting torch comprising:

a generally cylindrical elongate electrode body;

a high thermionic emissivity material disposed at a distal end of the electrode body;

an internal electrical contact surface at a proximal end of the electrode body, the internal electrical contact surface sized to receive a circumscribing radial spring element;

an external gas cooled surface including a cooling gas flow channel defined one or more fins and configured to direct a majority of a cooling gas flow between opposing surfaces of the one or more fins of the cooling gas flow channel, the external gas cooled surface disposed opposite the internal electrical contact surface, the one or more fins having a height and a width, the height of the opposing surface of the one or more fins being greater than a width of the channel between the opposing surfaces; and a wall thickness between the internal electrical contact surface and the gas cooled surface sized to provide a thermal conductive path that transfers sufficient heat to the cooling gas flow channel during operation of the torch to prevent premature failure of the electrode.

21. The electrode of claim 20 wherein the internal electrical contact surface is sized to center the circumscribing radial spring element.

22. The electrode of claim 20 wherein the internal electrical contact surface comprises a feature to retain the circumscribing radial spring element within a bore that is at least partially defined by the internal electrical contact surface.

23. The electrode of claim 20 wherein a ratio of a diameter of the internal electrical contact surface to a length of the internal electrical contact surface is less than about ⅔.

24. The electrode of claim 20 wherein the internal electrical contact surface has a length that is not more than about three times a diameter of the internal electrical contact surface.

25. The electrode of claim 20 wherein the cooling gas flow channel comprises a spiral groove disposed on an external surface of the electrode.

26. The electrode of claim 20 wherein the cooling gas flow channel can be supplied by more than one gas source.

27. The electrode of claim 20 wherein the cooling gas flow channel comprises the width, a height and a length dimensioned to establish a pressure drop that results in sufficient heat transfer from the electrode to a cooling gas flow channel during operation of the torch.

28. The electrode of claim 20 wherein the internal electrical contact surface is conductively cooled by a cooling gas flow.

29. The electrode of claim 20 wherein the internal electrical contact surface reacts against the circumscribing radial spring element when installed in the torch.

30. The electrode of claim 29 wherein the circumscribing radial spring element is attached to the torch by a diametric interference fit.

31. The electrode of claim 29 wherein the cooling gas flow channel is dimensioned to provide an amount of pressure drop sufficient to overcome a longitudinal frictional resistance between the internal electrical contact surface and the circumscribing radial spring element.

32. The electrode of claim 20 wherein the internal electrical contact surface includes the circumscribing radial spring element that, when installed in the torch, reacts against an electrical contact surface of the torch.

33. The electrode of claim 22 wherein the cooling gas flow channel is dimensioned to provide an amount of pressure drop sufficient to overcome a longitudinal frictional resistance between the electrical contact surface of the torch and the circumscribing radial spring element.

34. The electrode of claim 32 wherein the circumscribing radial spring element is attached to the internal electrical contact surface by a diametric interference fit.

35. The electrode of claim 20 wherein the height of each fin is greater than half of the width.

36. A gas-cooled plasma arc torch system comprising:

a torch body including a plasma gas flow path for directing a plasma gas to a plasma chamber in which a plasma arc is formed;

an electrode disposed relative to a proximal end of the torch body;

a nozzle disposed relative to the electrode at a distal end of the torch body to define the plasma chamber, the nozzle comprising:

- a generally hollow conductive body configured to receive the electrode;
- a plasma exit orifice disposed at an end of the nozzle body; and
- a cooling gas flow channel defined by one or more fins disposed about an exterior surface of the nozzle body and configured to direct a majority of a cooling gas flow between opposing surfaces of the one or more fins of the cooling gas flow channel thereby allowing a lesser amount of the cooling gas to flow over the fins, the nozzle body providing a thermally conductive path that transfers heat from the nozzle to the cooling gas flow channel during an operation of the torch, the one or more fins having a height and a width, the height of the opposing surfaces of the one or more fins being greater than a width of the channel between opposing surfaces; and a shield disposed relative to the nozzle at the distal end of the torch body, the shield comprising:

a generally hollow conductive body configured to protect the nozzle;

a cooling gas exit orifice disposed at an end of the body; and a cooling gas flow channel defined by one or more fins disposed about an exterior surface of the shield body and configured to direct a majority of a cooling gas flow between opposing surfaces of the one or more fins of the cooling gas flow channel thereby allowing a lesser amount of the cooling gas to flow over the fins, the shield body providing a thermally conductive path that transfers heat from the shield to the cooling gas flow channel during an operation of the torch, the one or more fins having a height and a width, the height of the opposing surfaces of the one or more fins being greater than a width of the channel between opposing surfaces.

* * * * *

UNITED STATES PATENT AND TRADEMARK OFFICE

CERTIFICATE OF CORRECTION

PATENT NO. : 8,089,025 B2
APPLICATION NO. : 12/032630
DATED : January 3, 2012
INVENTOR(S) : Nicholas A. Sanders It is certified that error appears in the above-identified patent and that said Letters Patent is hereby corrected as shown below:

On the cover page, item [60] the Related U.S. Application Data
delete “Provisional Application No. 60/904,804, filed on Feb. 16, 2007”
and replace it with
-- Provisional Application No. 60/901,804, filed on Feb. 16, 2007 --

Signed and Sealed this
Third Day of July, 2012

David J. Kappos
*Director of the United States Patent and Trademark Office*